C. M. GREEN.
WRAPPING AND LABELING APPARATUS.
APPLICATION FILED SEPT. 1, 1915.

1,280,212.

Patented Oct. 1, 1918.
15 SHEETS—SHEET 1.

WITNESSES:
C. F. Stackpole
Anna B. Lindsay

INVENTOR.
Charles M. Green
BY Mitchell, Chadwick & Kent
ATTORNEYS

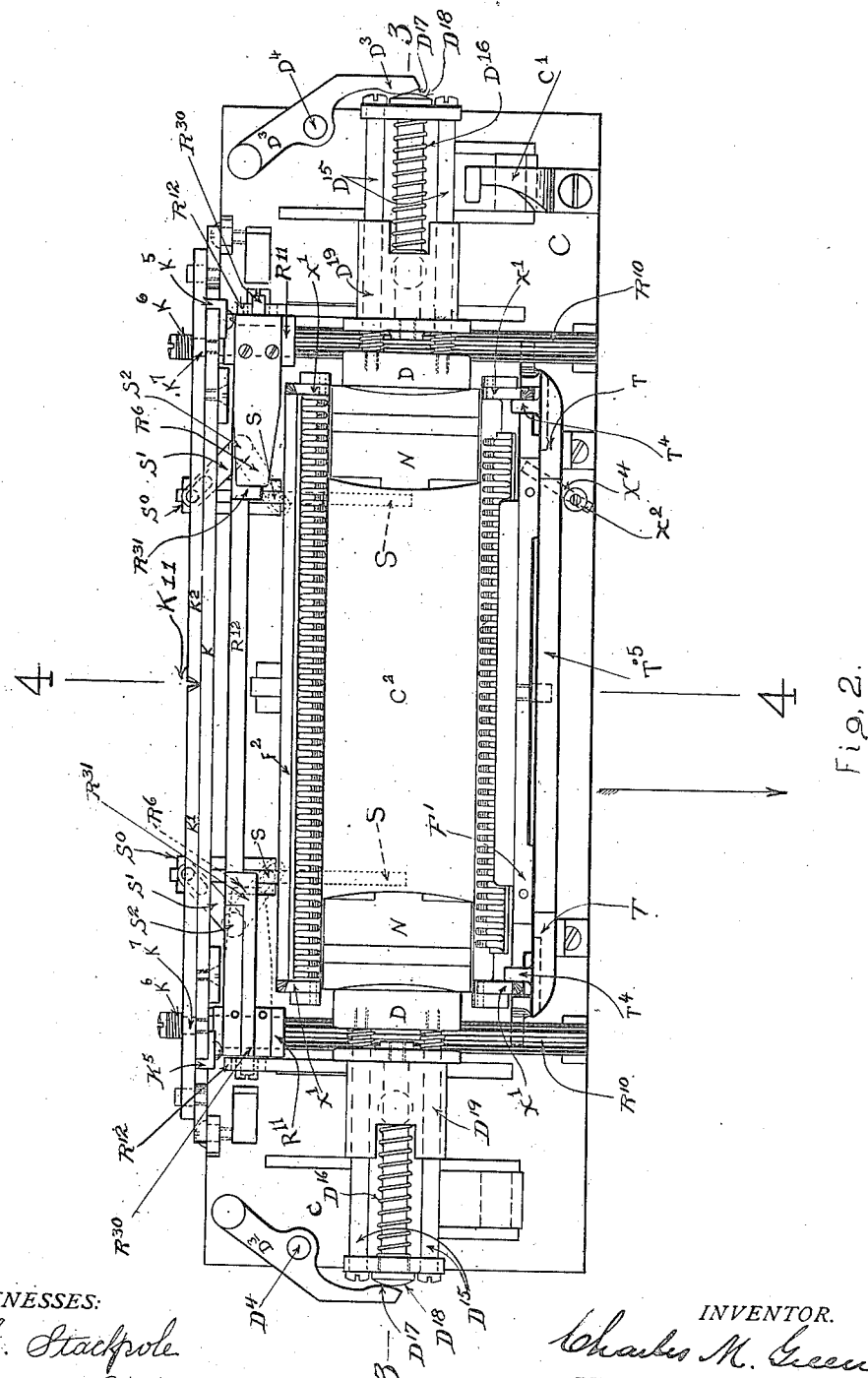

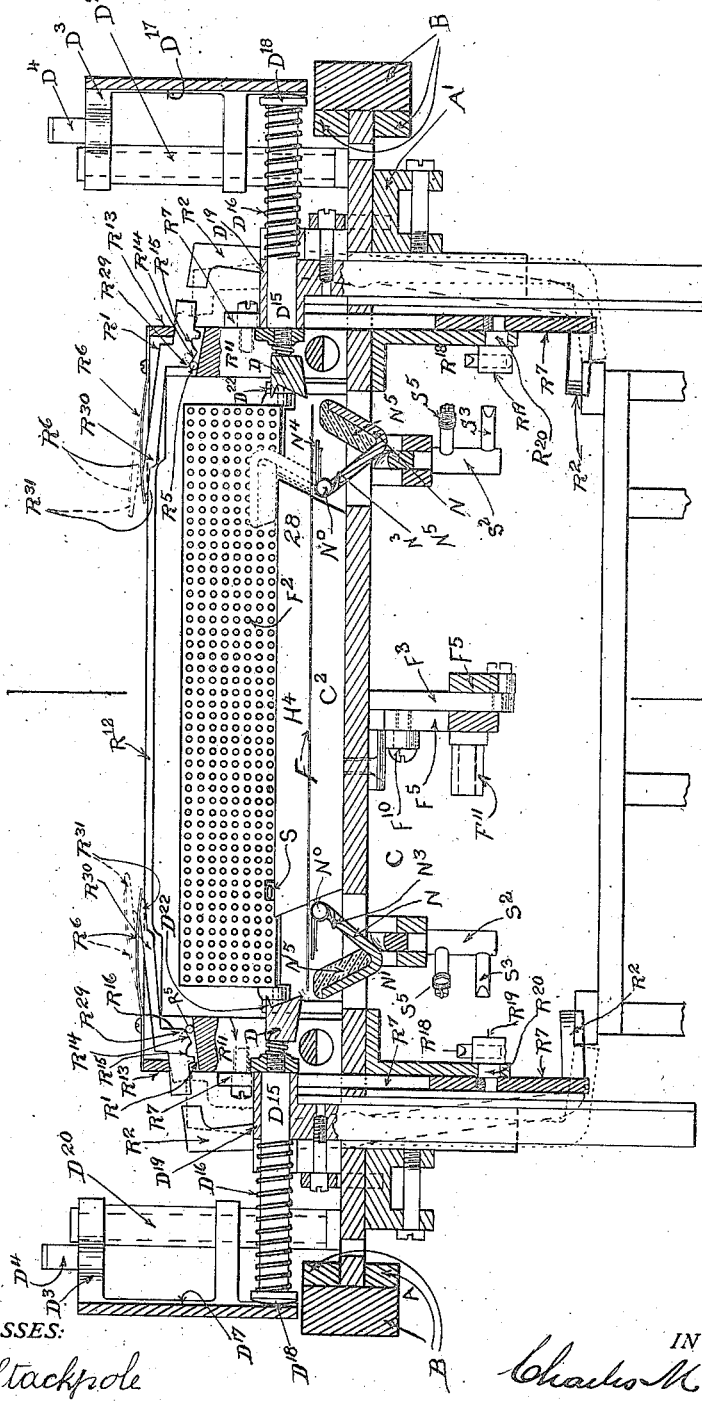

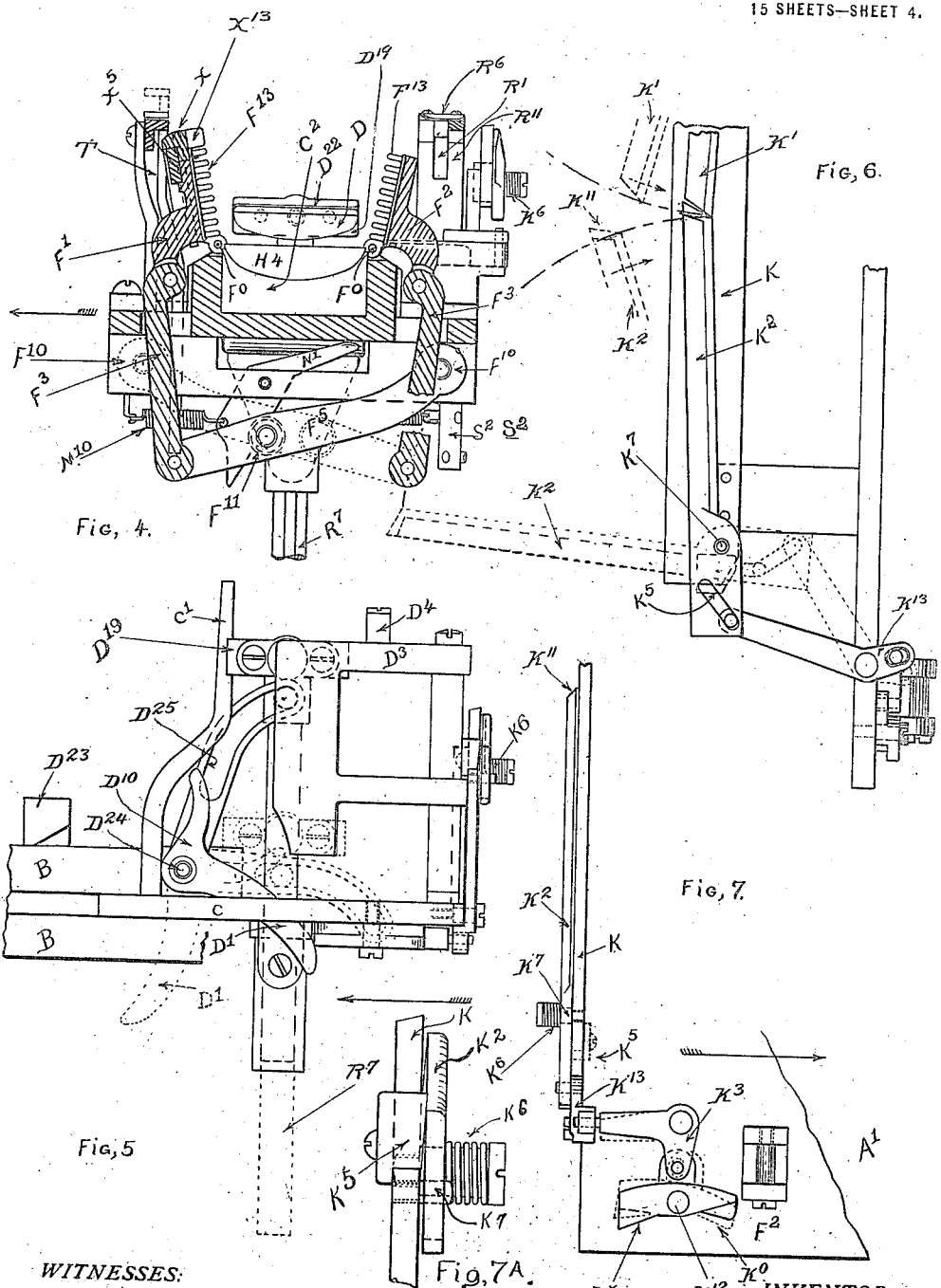

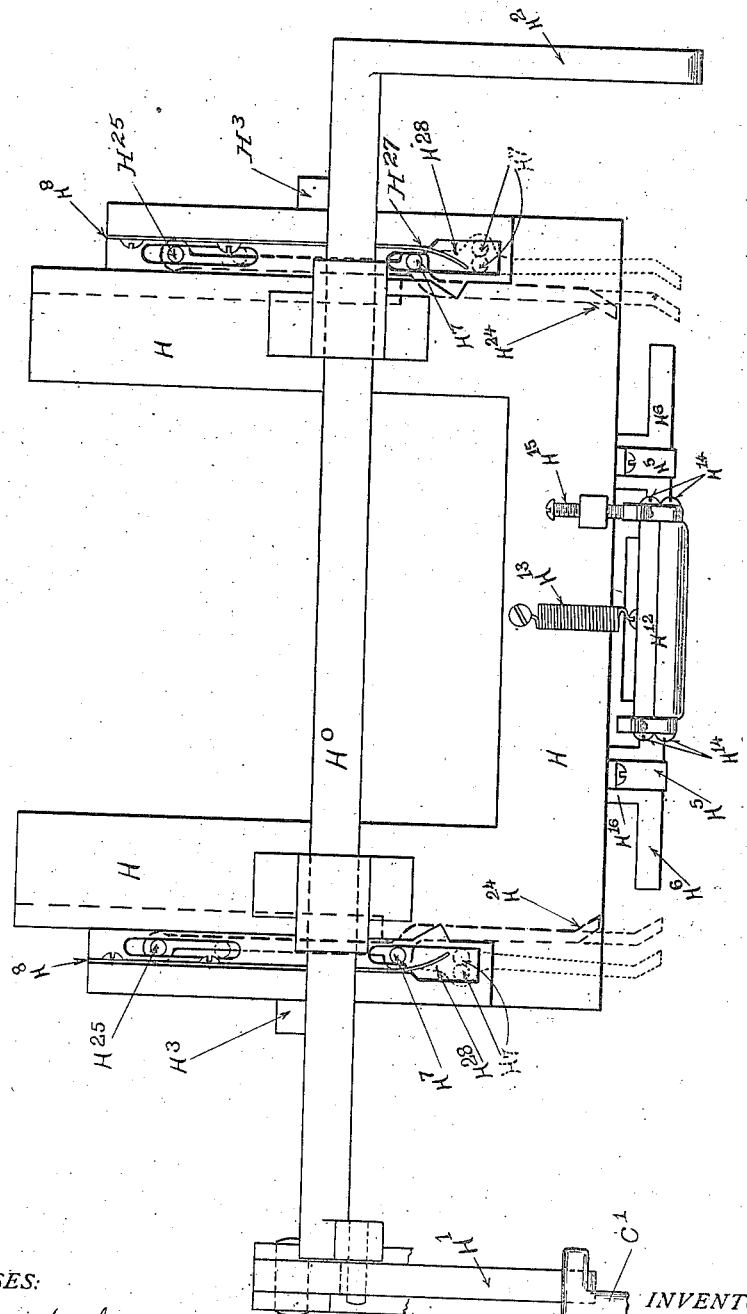

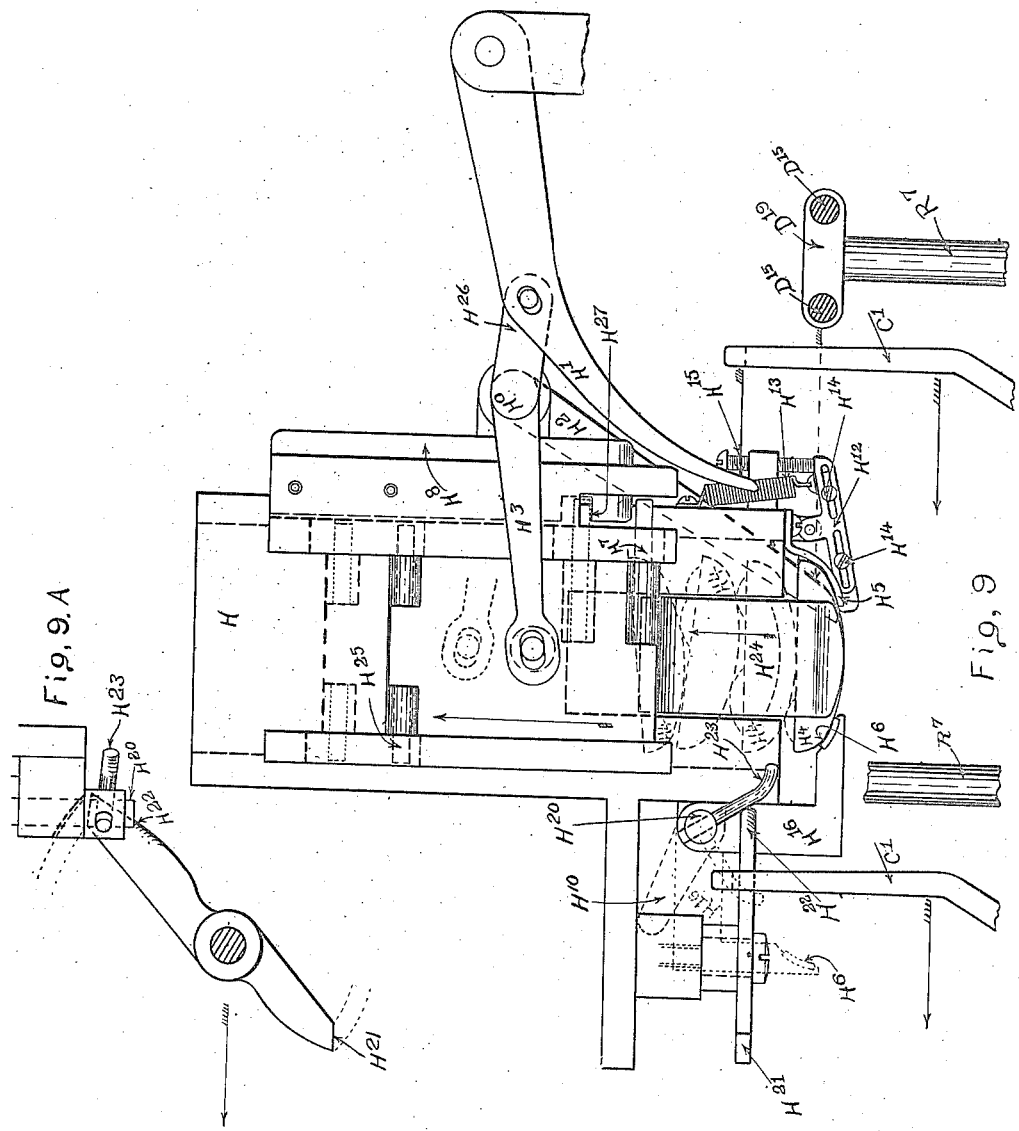

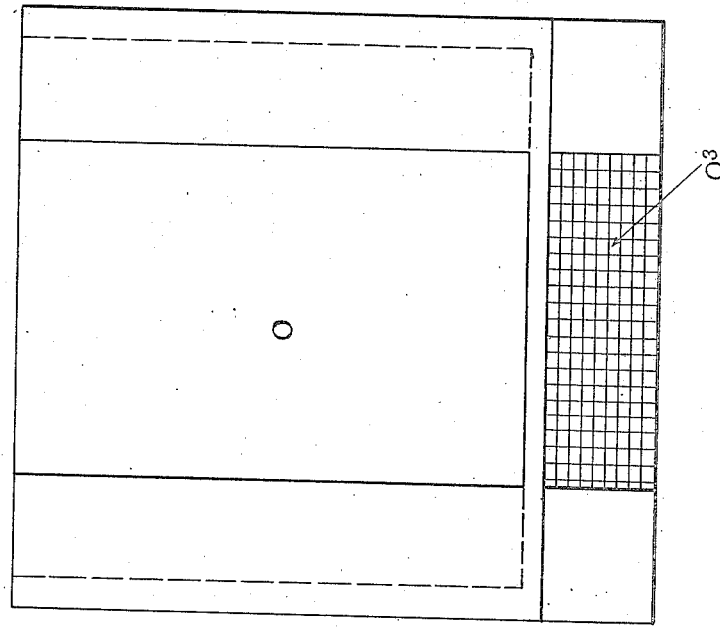
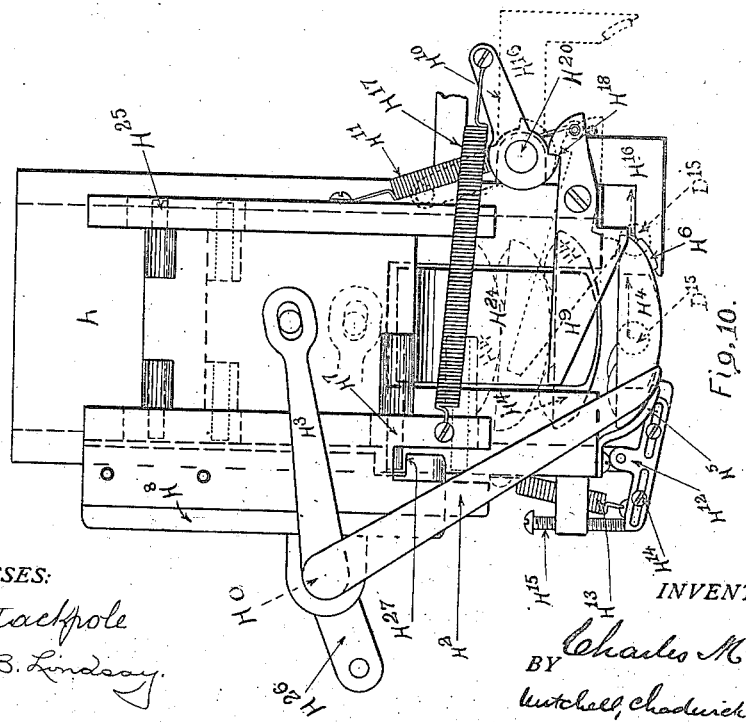

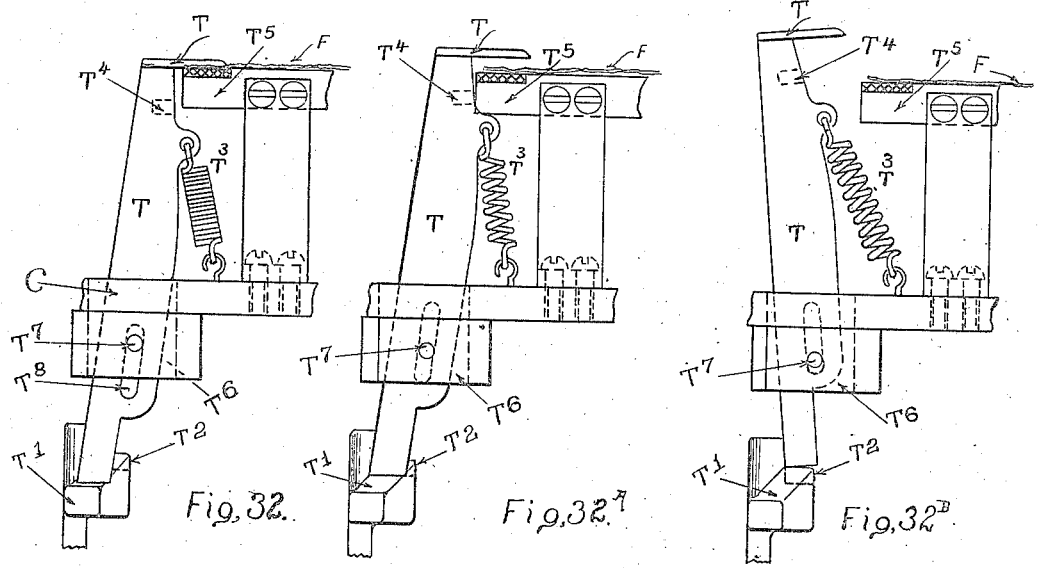
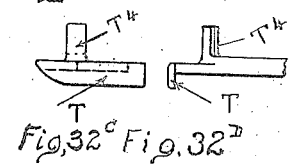
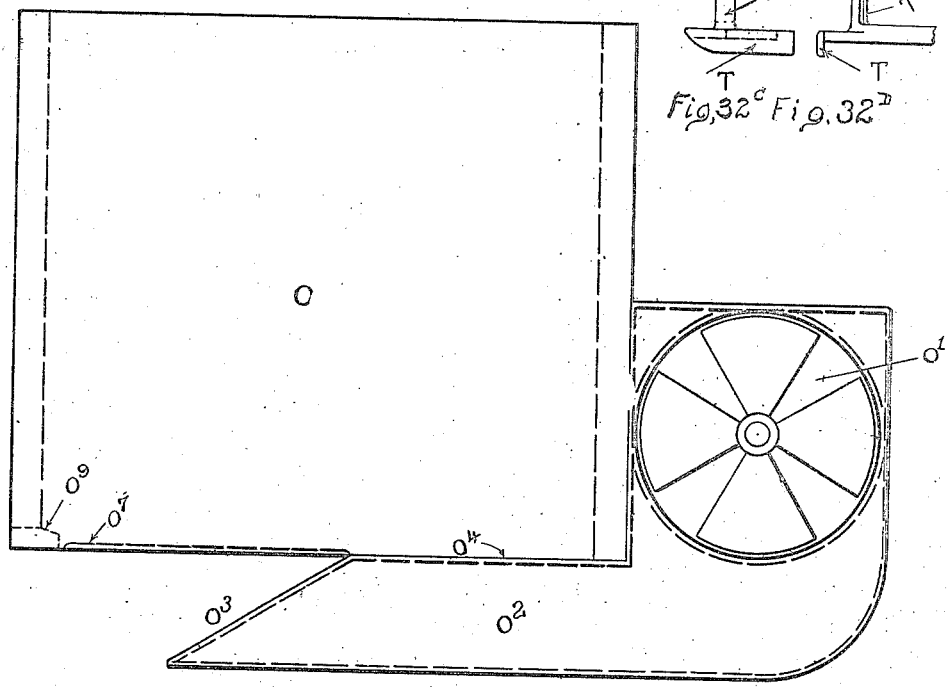

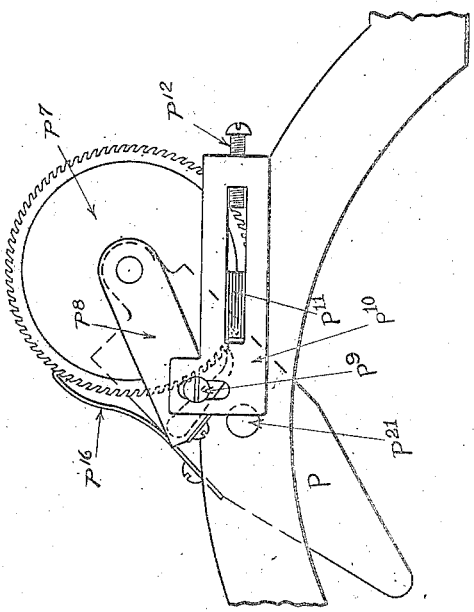
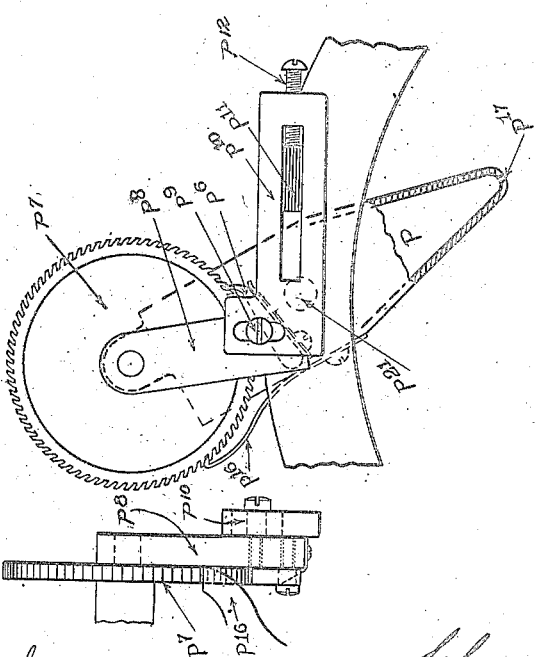

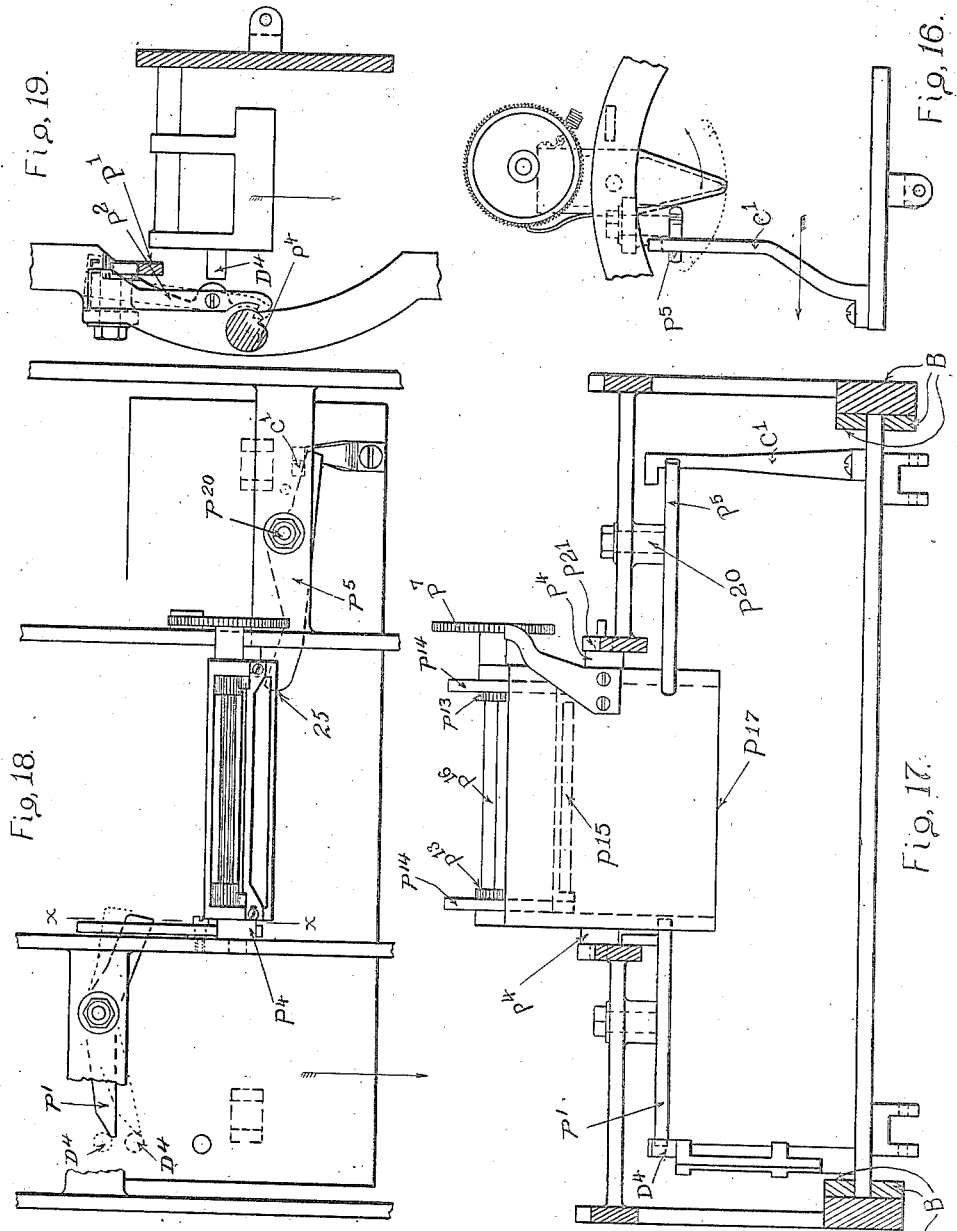

C. M. GREEN.
WRAPPING AND LABELING APPARATUS.
APPLICATION FILED SEPT. 1, 1915.

1,280,212.

Patented Oct. 1, 1918.
15 SHEETS—SHEET 12.

WITNESSES:
C. F. Stackpole
Anna B. Lindsay

INVENTOR.
Charles M. Green
BY
Mitchell, Chadwick & Kent
ATTORNEYS

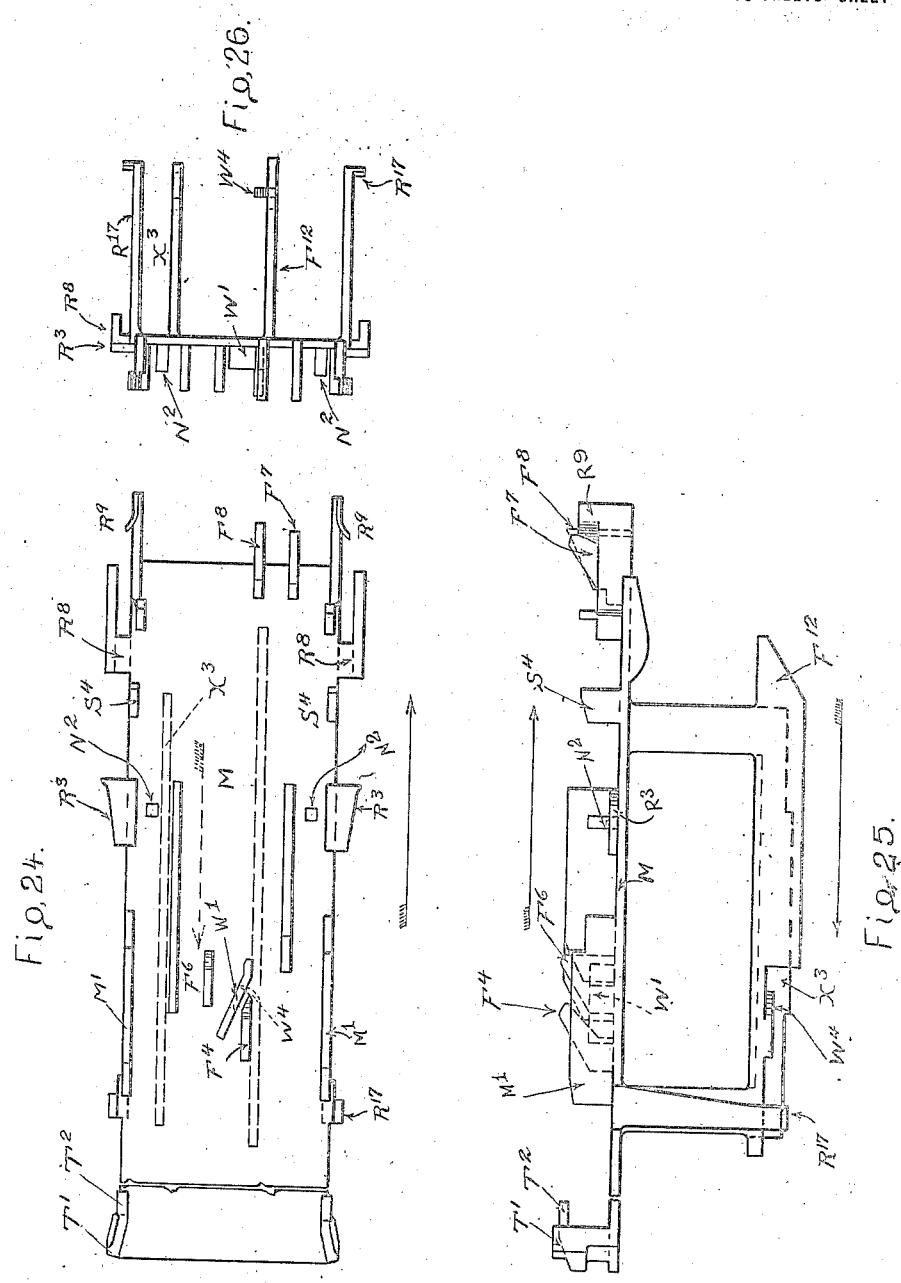

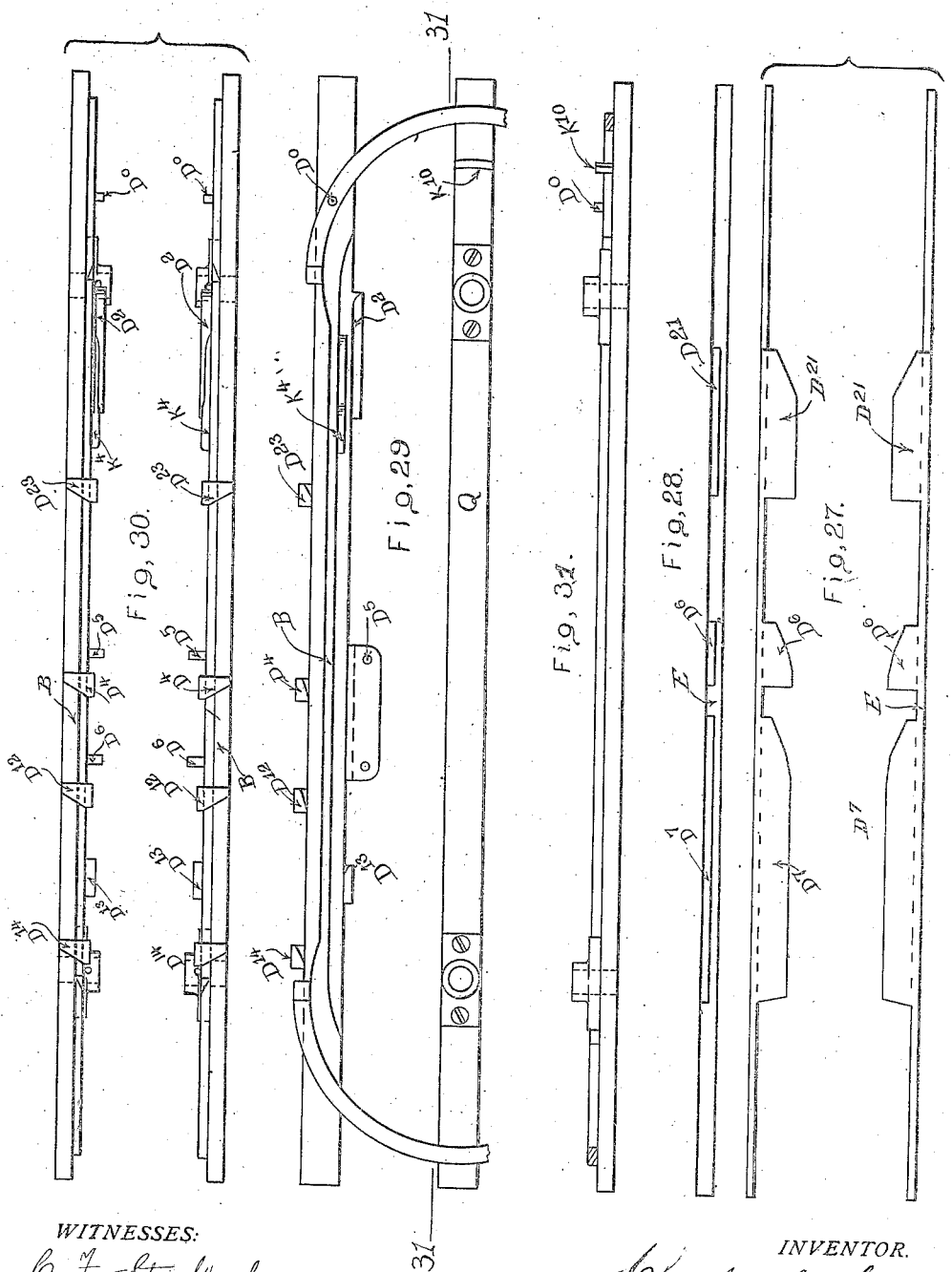

UNITED STATES PATENT OFFICE.

CHARLES M. GREEN, OF MARBLEHEAD, MASSACHUSETTS.

WRAPPING AND LABELING APPARATUS.

1,280,212.     Specification of Letters Patent.     Patented Oct. 1, 1918.

Application filed September 1, 1915. Serial No. 48,519.

*To all whom it may concern:*

Be it known that I, CHARLES M. GREEN, a citizen of the United States, residing at Marblehead, in the county of Essex and State of Massachusetts, have invented new and useful Improvements in Wrapping and Labeling Apparatus, of which the following is a specification.

This invention relates to improvements in wrapping and labeling apparatus. It is the object of the invention to provide mechanism for placing one or more wrappers, the outer of which may also be a label, on articles of regular or irregular shape. The invention is illustrated as it may be applied to a certain form of chocolate almond bars, for wrapping each such bar completely in tinfoil and then wrapping and sealing a protective paper label around the tinfoil; but the utility of the invention and the application of the principles here disclosed are by no means limited to that particular commodity nor to those styles of wrapping. The particular bars of chocolate which the illustrated apparatus is designed to handle are somewhat in the form of a segment of a cylinder, being round on one side, unevenly flat on the opposite side, owing to the projection of almonds irregularly therefrom; and beveled on both ends, at an angle of about 60°, so that the flat side of the bar is longer than its rounded side.

These irregularities of shape, the angles, and the soft character of the material, make the bar peculiarly difficult to introduce automatically to wrapping apparatus with requisite precision and certainty. They also make it difficult to handle in such manner as to wrap it completely and smoothly with tinfoil, without breaking the tinfoil; and to handle in other respects during the operation of the mechanism thereon, so as to produce a finished package that is regular in appearance. These irregularities also cause the bars to stack so irregularly when assembled in quantity ready to be wrapped that the exercise of human intelligence, and the human hand, has heretofore been necessary in order to take them one at a time.

It is among the objects of the invention to provide means for feeding such bars automatically; to arrange them with certainty and regularity, in position for the automatic feeding, in order to do away with the human handling which has hitherto been indispensable; also to provide a mechanism that is elastic and automatically adjustable to each bar at all stages of the operation, in order to enwrap the tinfoil closely about it as would be done by the fingers of a living operator; and yet at the same time to eliminate all human touch, while the bar is being completely incased in its wrapping and labeled; and to carry out these processes at a relatively high speed without injury to the material, thus supplanting the services of a considerable number of people. It is also the object of the invention to provide the other advantages that are characteristic of the apparatus herein described, further details of which will appear in the description that follows. The principles of the invention may however be applied in a variety of ways other than the specific way here set forth, and it is the object of the patent to cover in the appended claims whatever features of patentable novelty exist in the invention disclosed.

In the accompanying drawings,

Fig. 2 is a plan of one of the carriages;

Fig. 3 is a side elevation of one of the carriages in section on the line 3—3 of Fig. 2;

Fig. 4 is an end elevation of the carriage looking in a direction corresponding to that of Fig. 1, in section on the lines 4—4 of Figs. 2 and 3;

Fig. 5 is an end elevation of the carriage;

Fig. 6 is a side elevation of a fragment of the carriage showing the tin foil severing knives;

Fig. 7 is a plan of the parts shown in Fig. 6;

Figure 1:
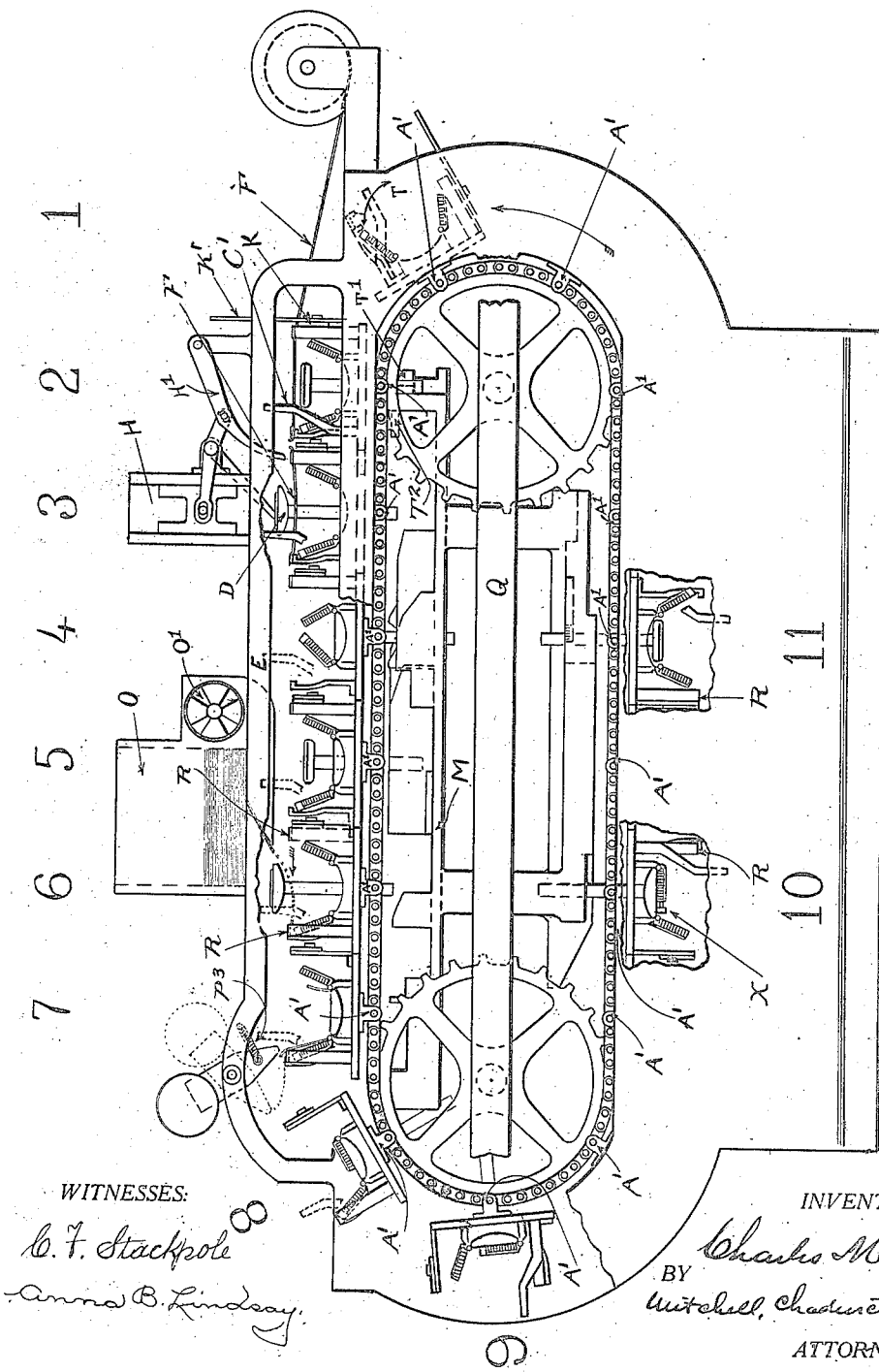
Figure 1 is an elevation showing the machine as a whole, with parts in their different stages of operation; called herein an end elevation as it is a view endwise of the shafting and carriages, although not in a direction in which the carriages move.
Figure 13:
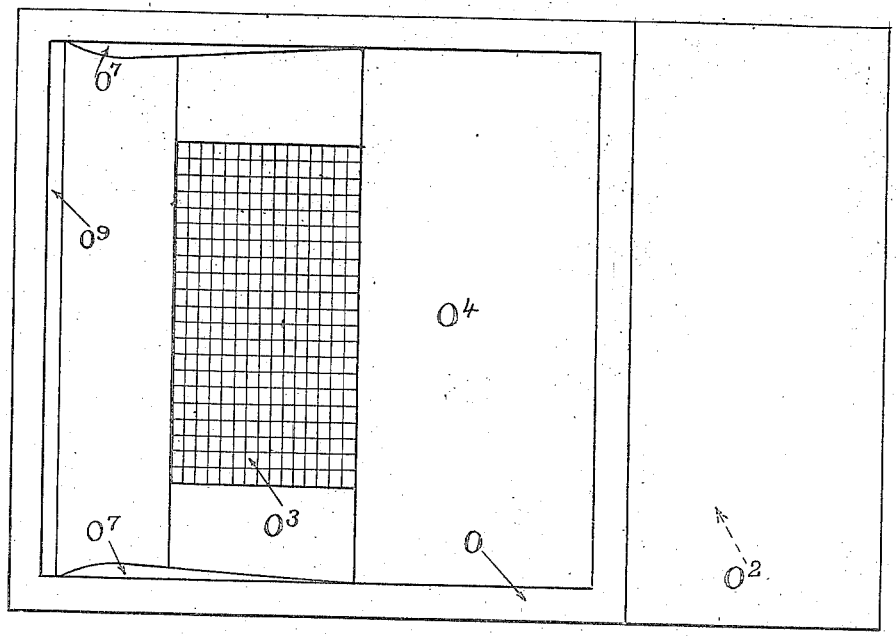
Figure 35:
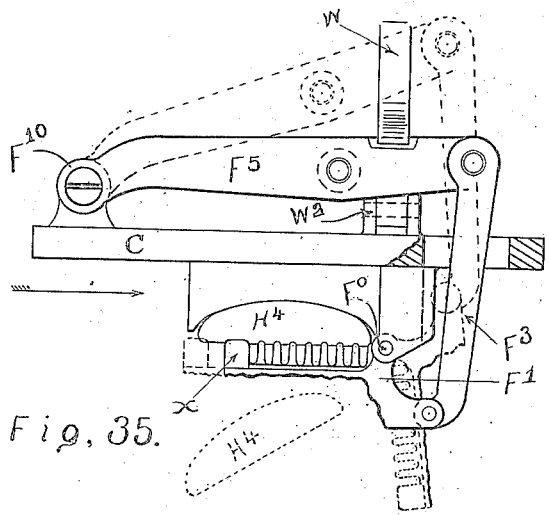
Figure 21:
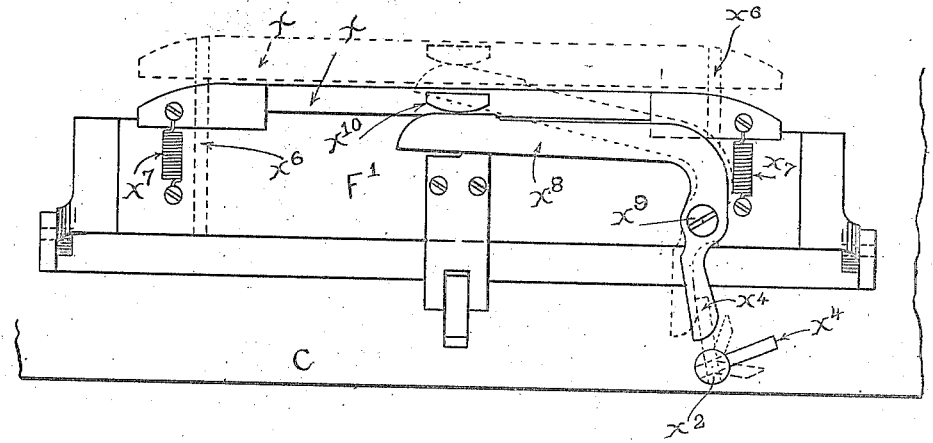
Figure 22:
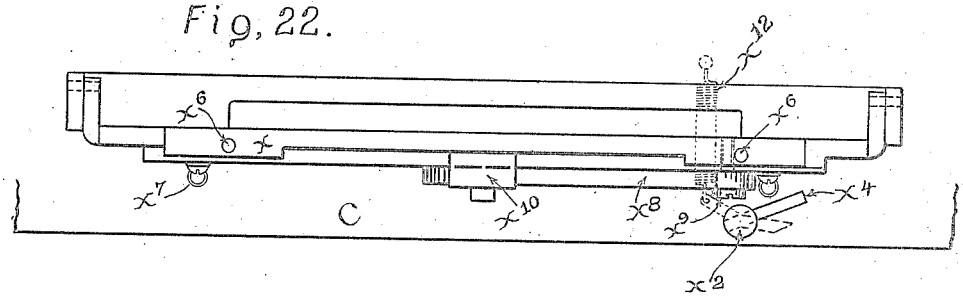
Figure 23:
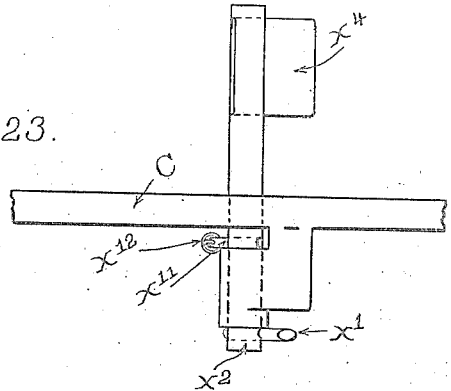
Figure 34:
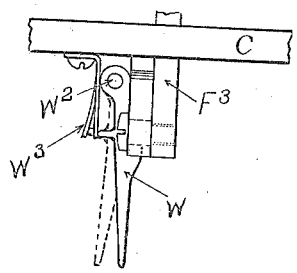
Figure 33:
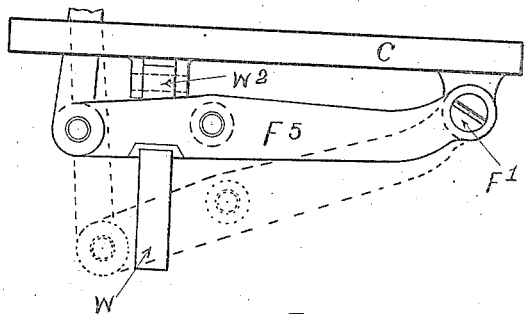

Fig. 7ª is a plan of a detail of Fig. 7 on a larger scale, and turned around;

Fig. 8 is a side elevation of the hopper and attached parts at position 3 of Fig. 1;

Fig. 9 is an end elevation of the same, showing also fragments of two passing carriages;

Fig. 9ª is a plan of parts which appear in elevation below it in Fig. 9;

Fig. 10 is an end elevation of the hopper showing the end that is remote from the eye in Figs. 9 and 1;

Fig. 11 is a side elevation of the label box and related parts, which is a stationary part of the mechanism seen in Fig. 1;

Fig. 12 is an end elevation of the same;

Fig. 13 is a plan of the same;

Fig. 14 is an end elevation of pasting mechanism which in Fig. 1 is positioned midway between 7 and 8;

Fig. 15 is an end elevation of the same, showing the other end;

Fig. 16 is an end elevation of the same, showing its interaction with a part on the moving carriage;

Fig. 17 is a side elevation of the same, showing the paste-box and parts of the moving carriage;

Fig. 18 is a plan of the parts shown in Fig 17;

Fig. 19 is an end elevation of parts appearing beside it in Fig. 18;

Fig. 20 (on sheet with Fig. 14) is a side elevation of parts appearing beside it in Fig. 14;

Fig. 21 is a plan showing details of parts of the carriage that pertain to the sealing action; said parts being represented as having been turned into their horizontal position, as in the act of sealing;

Fig. 22 is a plan showing the same with the parts turned up vertically, being an edge view thereof;

Fig. 23 is a side elevation showing details of parts appearing above it in Fig. 22;

Fig. 24 is a plan of the cam plate, on a reduced scale;

Fig. 25 is an end elevation of the same;

Fig. 26 is a side elevation of the same, looking in the direction in which the carriages travel on the machine;

Fig. 27 is a plan of the cam bars on the same reduced scale;

Fig. 28 is an end elevation of the same;

Fig. 29 is an end elevation of other cam bars on the same reduced scale;

Fig. 30 is a plan of the same;

Fig. 31 is a plan of the same in section on the line 31—31 of Fig. 29;

Fig. 32 (on sheet with Fig. 12) is a side elevation showing a detail of apparatus on the carriage for gripping tin foil;

Figs. 32$^a$ and 32$^b$ show similar elevations, with the same parts in different operating positions;

Fig. 32$^c$ is a plan of a detail whose position is seen above it in Fig. 32$^b$;

Fig. 32$^d$ is an end elevation of the same detail;

Fig. 33 is an end elevation showing the latch, a detail on the carriage;

Fig. 34 is a side elevation of the same;

Fig. 35 (on sheet with Fig. 13) is an end elevation showing the same parts which are seen in Fig. 33 after they have been inverted by further progress of the carriage and showing how the chocolate is held and released.

Figure 36:
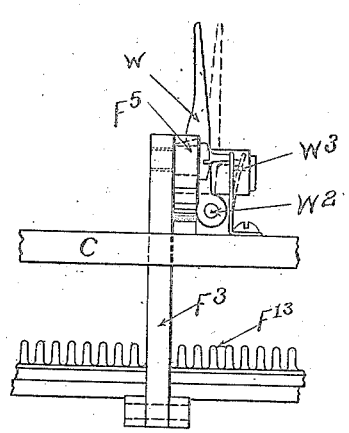
Figure 38:
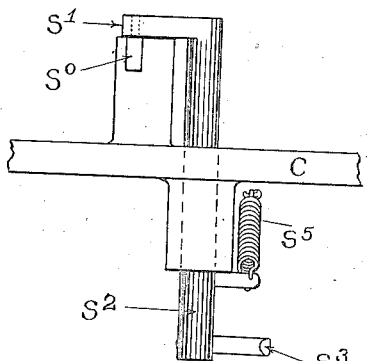
Figure 37:
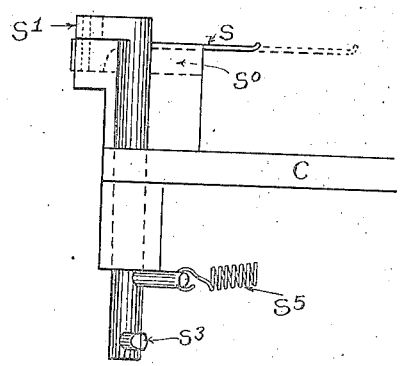

Fig. 36 is a side elevation of the same;

Fig. 37 is an end elevation showing in detail a part which helps hold the label down during the folding operation;

Fig. 38 is a side elevation of the same; and

Figure 39:
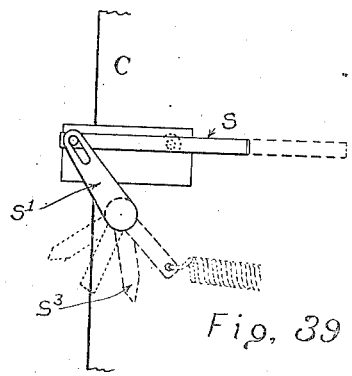

Fig. 39 is a plan of the same.

When in operation each carriage C will draw forth a supply of tinfoil F, sever a sufficient portion by knives K; take a single chocolate bar H$^4$ from the supply and assemble it with the severed tinfoil; fold the forward and rear flaps of the tinfoil over the top of the bar; tuck the tops of the projecting ends of the tinfoil down and inward upon the ends of the bar, drawing in the sides at the same time; fold the remaining end projections of tinfoil up smoothly over the beveled ends of the bar and down upon the top of the bar; separate a single paper label from the stationary supply O; position it under the wrapped bar; deposit a measured amount of paste from the supply P on the leading edge of the label; fold the rear edge of the label over the bar; fold the leading edge over; specially compress the pasted portion of the leading edge upon the folded rear portion; hold it while the paste sets; and then discharge the article and its two wrappers from the machine ready for market. Incidentally this involves a solution of a number of problems, among which are the control of the supply of chocolate bars so that, notwithstanding their irregular shape and arrangement in the hopper, the one that is needed for wrapping is precisely positioned for being taken; the holding of the bar positively under control at all times; the proper positioning of this bar and the tinfoil wrapper with respect to each other; the proper handling of the two so that the tinfoil is not broken; the provision of severing means which will work for a long period on the metallic foil, without sharpening and with clean-cut execution, without wrinkling the tinfoil; the tucking in of the ends of the tinfoil as a preliminary step, and the laying of the remainder smooth on end and top as a final step in making a finished inclosure; and the transference of a second wrapper from an overhead supply into a position under the article; the control and measurement of the supply of paste; holding of the first flap against the elasticity of the paper, while the second flap is being folded; and other problems the solution of which is found in the mechanism and arrangement disclosed.

In the machine a conveyer is provided consisting of two parallel and similarly moving endless chains A, which in the particular machine here illustrated are about ten inches apart, with carriages C bridging the space between them. Guided by suitable sprocket wheels seen in Fig. 1 and driven by any suitable power, these conveyer chains move the carriages around a circuit extending horizontally to the left on the upper level, as viewed in that figure; and coming back inverted on the lower level. The particular position of the carriages which happen to be portrayed in Fig. 1 are marked with ordinal numerals for easy reference, but it must be remembered that these are only instantaneous positions and that the action of the conveyer mechanism is really continuous, each carriage passing at a regular rate progressively from one position to another around the circuit, and consequently passing through all intervening positions, between the particular ones illustrated; and also that in some cases the exigencies of clear illustrations without undue repetition may have led to some slight distortion in the drawing. For example, in Fig. 1, the positions of parts illustrated in different portions of the circuit are shown so as to portray the operations of the parts, using the positions of the carriage which are nearest to those to the position where the respective operations actually occur, even though the precise position where the operation occurs may happen to be one of the intervening positions that is not illustrated. In so doing each carriage moves past a series of cams Figs. 24 to 30, some of which, on bars B, coöperating with others on bars E, actuate chocolate grippers D which manipulate the chocolate almond bars and subject them to the action of other apparatus on the carriage, which is actuated by other cams as the carriage moves onward.

Each gripper is referred to in general terms by the letter D, which however indicates specifically the head or jaw which engages the chocolate. This jaw is therefore, designed of a shape according to the characteristics of the particular article on which the machine is to work. In the present case it has to work upon a chocolate bar whose end surface, presented toward the gripper, retreats at an angle of about 60° from the vertical. The operating face of the gripper is accordingly made at that angle. For the purposes of the operation of the machine the chocolate bars $H^4$ are inverted, with that side down which is the top when marketed. This brings the round and shorter side underneath, leaving the longer and roughly flat side on top as illustrated in Fig. 3. It will therefore be more convenient herein to refer to the flat side as the top of the bar and the round as the bottom, this being their relative position during the greater part of the operations herein described, although this is the reverse of the sides to which the terms "top and bottom" refer when the completed bars are put on the market. Looking at Fig. 3 it will be understood that the grippers, and many other parts, are arranged in duplicate, one acting at each end of the chocolate bar or carriage, but with respect to the chocolate grippers it will be plain from Fig. 3 that if the jaw D at each side of the carriage were to move inward toward the center at the proper elevation the inclined face of each would come into contact with one end of the chocolate bar $H^4$ resting against and under its undercut inclined end. The grip is made secure by the lip that projects inward at the top of each of the jaws with a slightly inclined under surface. Hence a chocolate almond bar may be gripped and firmly held, as to any up or down motion, by simply setting the two grippers D against its ends with sufficient firmness. One important feature of the invention, therefore, provides means for projecting the grippers D simultaneously inward into contact with the chocolate almond bar, thereby to seize it and for projecting them outward away from the bar. These movements are controlled by the apparatus shown in detail in Figs. 2 and 3. As the chocolate bars lie transversely of the machine, these movements are endwise with respect to the bar, but transverse with respect to the machine, the longitudinal direction of the machine being herein taken to be the direction in which the chains and carriages move. The shape of the head carrying the jaws is shown in elevation in Fig. 3 and in plan in Fig. 2. The latter of these shows that this head has dimension in the direction of the length of the machine equaling approximately the width of the chocolate bar. In designing a machine this length would naturally be determined by the width of the article that is to be handled, and made sufficient to afford a firm and steady hold upon the end of the article. Each gripper head D is spring mounted on two horizontal guide rods $D^{15}$ which slide transversely in and out through bearings in a supporting block $D^{19}$. They are normally pressed outward, by springs $D^{16}$, into contact with operating levers $D^3$ which have extended vertical faces $D^{17}$, against which a knob $D^{18}$ on the outside of one of the gripper guiding rods $D^{19}$ rubs up and down whenever its stem $R^7$ is raised or lowered (see Fig. 5). The levers $D^3$ are mounted on the carriage on vertical pivot pins $D^{20}$ and carry upstanding pins $D^4$ which are adapted to engage the cams $D^{21}$, $D^6$ and $D^7$ (Figs. 27, 28). The action of each of these cams is to force the pin $D^4$ inward and thus to swing its lever $D^3$ inward, forcing the guide rods $D^{19}$ and gripper D inward far enough for the grippers to engage the chocolate bar. When the pins reach the ends of either of these pairs of cams $D^{21}$, $D^6$, $D^7$, the spring $D^{16}$ forces the parts out again to the positions illustrated in Figs. 2 and 3. This in and out movement may occur at whatever elevation the block $D^{19}$ may happen to be, whether it be stationary or in motion vertically. Consequently the grippers D are capable of a compound motion by which they may rise and reach inward somewhat like a human hand to grip the chocolate bar which is ready waiting in the holder $H^6$, $H^5$, deposit the bar upon the cradle block $C^2$, and then withdraw to the sides of the machine until they are needed for another operation, being meanwhile out of the way of the operation of other parts. In particular, the machine should be designed with the positions of rest of these grippers far enough to the sides to clear the width of tinfoil, thus leaving the clearance in which the first folding operations may be performed without hindrance.

Before describing the folding action, it will be clearest to describe the construction and preliminary operations by which the tinfoil and the chocolate are assembled together in proper position for the folding. These include the severing of the tinfoil, the separation of a single chocolate bar from a number in the hopper, its proper placing to be taken by the chocolate grippers, and the coöperating movements which result in the chocolate and the tinfoil being ultimately found together in proper position.

The tinfoil strip F lies continuously in substantially the position shown in Fig. 1, in which position it is continuously in motion to the left. The carriage has tinfoil grippers T, one on each side, the gripping ends of which are capable of a compound motion, one aspect of which is suggested by the dotted lines at T in position 1, Fig. 1, and the execution of which motion is more fully shown in Figs. 32, $32^a$ and $32^b$, taken in connection with the cams $T^1$ and $T^2$ shown in Figs. 24 and 25, which cause those motions. The tinfoil grippers are mounted on the leading edge of the carriage plate C, Figs. 1 and 2, and are adapted to swing upward and outward from the carriage as the place is approached where the tinfoil is to be gripped and then snapping down upon the top of the tinfoil, moving in so doing from the position of Fig. 32 to that of Fig. $32^b$, and back to that of Fig. 32. This spreads them apart enough to clear the strip of tinfoil F, as the carriage rises under it from position 1 to position 2 (Fig. 1), and allows the leading bar $T^5$ to rise into contact with the underside of the tinfoil strip to serve as a support for the middle part of the strip and as a block or jaw upon which the edges of the strip are clamped down by the grippers T when they finally reach again the position of Fig. 32. This movement of the tinfoil grippers T is made possible by the construction illustrated in Fig. 32 where it is seen that the upright part of the gripper T is a bar passing down through a slot $T^6$ in the carriage plate C. This slot holds the gripper steady while it is swinging transversely of the machine on a pin $T^7$ therein that passes through a slot $T^8$ in the upright. The upright can therefore move up and down with respect to the pin $T^7$ and swing in and out while doing so. The cams $T^1$, $T^2$, Figs. 24, 26, are fixed in proper position so that as the grippers get near the tinfoil strip the cams $T^1$ lift the grippers from their position of Fig. 32 to that of Fig. $32^a$; and the cams $T^2$, operating laterally, push their tails inward and so throw the tops outward to the position indicated in Fig. $32^b$, where the position of a tinfoil gripper is shown after it has cleared the tinfoil strip and the latter is resting on the supporting bar $T^5$. An instant later the tail of this gripper passes beyond the cams $T^1$, $T^2$, and the spring $T^3$ draws the gripper back down to the position illustrated in Fig. 32, but pressing upon the strip of tinfoil under which the carriage has risen in the meantime so as to assume the position relative to the strip that is shown in Fig. $32^b$. The strip of tinfoil is thus held and drawn forward with the carriage. When the next following carriage has risen to position 2 and has gripped the portion of tinfoil which lies over it, the strip is thus held at two places, and is ready for the part in front of the second carriage cut off in the manner and by the mechanism now to be described.

The severing of the tinfoil strip is effected by knives, consisting of the blade K which is stationary on the carriage and the blades $K^1$ and $K^2$, which co-act with the blade K with a shearing action. The knives are arranged at the rear edge of each carriage, projecting backward a little, as clearly seen in Fig. 2, so that, as each carriage is close to its neighbor when they are moving on a level, the cut is located just over the forward edge of the next succeeding carriage, and, in fact, just forward of where the strip is held by the tinfoil grippers T on that carriage, as seen in Fig. 1. The arrangement of the knives is seen in Figs. 2 and 4-7.

The moving blades $K^1$, $K^2$, turn about pivots $K^7$, one at each end of the fixed blade K, when actuated through a system of compound leverage $K^3$, $K^{13}$, best seen in Figs. 6 and 7, controlled by a dog pivoted at $K^{12}$ on the underside of the carriage, and having faces $K^0$ and $K^x$. This dog seen in Fig. 7, is capable of swinging between the full line and dotted line positions, thus swinging the horizontal bell crank lever $K^3$, which swings the upright lever $K^{13}$, which in turn throws the knife blade $K^1$. Pin and slot joints are used, and the attachment to the knife blade is such that a very small movement of the dog about its pivot $K^{12}$ corresponds to about 90° swing of the blade. The knife blade $K^2$ is similarly operated, and is like the knife blade $K^1$ except that the ends of these two blades have complementary and coöperating beveled ends as indicated at $K^{11}$. The cams actuating these knives are set so that the blade $K^1$ descends just before the blade $K^2$ does, and rises just after it; and the bevel $K^{11}$ is such that this beveled end of the blade $K^2$ overlies the end of blade $K^1$, and thus, in swinging about its pivot, can reach and cut that portion of the tinfoil resting on the stationary blade $K$ which is not reached by the main cutting edges of the two blades because it lies between them. Thus in Fig. 6 dotted arcs indicate the travel of the extreme points of the main edges of the two blades showing that a small portion of tinfoil resting on the edge of the fixed blade $K$ would be uncut thereby, and also showing how the edge $K^{11}$ formed on the beveled end of the blade $K^2$ reaches this and thus severs the tinfoil completely.

It is a feature of importance in mechanism operating upon a metallic film such as tinfoil to have blades that will operate for a long period of time without becoming dull, both because of the importance of saving the time of sharpening, changing knives, etc., and also because the action of a dull blade is disastrous to the film of tinfoil, wrinkling, distorting and tearing it in such a manner as to interfere seriously with the perfect execution of the machine. Therefore one feature of the invention is aimed to make the knives automatically sharpen themselves or at least operate with a sharp clean shearing cut. This is effected by mounting the blades $K^1$, $K^2$, somewhat loosely on their pivots $K^7$ and by inserting a small spiral spring $K^6$ between the head of a pivot $K^7$ and the blade, tending to force each blade $K^1$ or $K^2$ flat against the face of the fixed blade $K$. The effect of the spring is, however, influenced by the presence of a small cam $K^5$ and by the fact that the blade $K^1$ is somewhat loose on its pivot $K^7$. The cam $K^5$ projects from that face of the stationary blade $K$ which is traversed by the blade $K^1$ or $K^2$, as it swings on its pivot $K^7$ between the positions illustrated in Fig. 6; and it is located in that direction from the pivot $K^7$ which is remote from the cutting edges. The face of this cam fixed at a slight incline to the face of the blade $K$ and has the greater projection at its upper portion, which is toward the cutting edge of that blade. Consequently as seen in Fig. 6, when the blade $K^1$ is in the dotted upright position, its spring $K^6$ holds the blade $K^1$ substantially flat against and parallel with the face of blade $K$, although extending perpendicular thereto, but as the swing of the blade $K^1$ progresses toward the full line position $K^1$ in Fig. 6, the upper, or left hand, edge of the blade $K^1$, being what is ordinarily called the back of the blade, rides up on this cam $K^5$ and is forced gradually outward away from the blade $K$, consequently tipping the whole blade $K^1$ out of parallelism with the blade $K$ and into a small acute angle therewith so that as the blade $K^1$ swings downward its edge is pressed against the edge of the blade $K$, and is not prevented from grinding down in close proximity to that edge by the fact, if such fact exists, that it has become dulled and worn back a little from the general plane of the face of the blade $K^1$. (See Fig. 7ª). This slight angle is maintained as the swing of the blade continues. The spring $K^6$ in fact holds the blade $K^1$ parallel to the face of the cam $K^5$. At the same time, as the spring $K^6$ presses on the blade $K^1$ it acts as the power on a lever, constituted by the blade $K^1$, whose fulcrum is the projecting cam $K^5$. With this cam $K^5$ as a fulcrum the spring $K^6$ pushes the cutting edge of the blade $K^1$ against the cutting edge of the blade $K$. As these cutting edges cross each other, the point of intersection being shifted along the whole length of the blade $K^1$ as the apex of the opening between the blade shifts in position, the effect of this leverage is concentrated on this single shifting, cutting point. As a result it is found in practice that the described construction operates with great effectiveness and durability, notwithstanding the dulling effect of the metal on which it is working. If the cutting edge of the blade $K^1$ wears back from the plane of the face of that blade, to what would produce a condition of dullness in an ordinary shears construction, nevertheless in the present apparatus the sharp cutting continues, because the slight looseness on the pivot $K^7$ enables the blade to tilt, as a result of which the spring $K^6$ can push the cutting edge of $K^1$ directly up against the cutting edge of the blade $K$, enabling the angle to change a little as the point of contact travels along. This action is purely automatic and consequently maintains this part of the machine in effective condition, regardless of the speed and duty of the machine, for a long time before the parts need to be renewed or changed.

The described motions of the blades are produced as follows: As each carriage approaches position 1 from the lower level, swinging upward around the sprocket wheel, cams $K^{10}$ on the cam bar Q, Fig. 29, engage the surfaces $K^x$ on the dogs pivoted on the carriage at $K^{12}$. This throws the blades $K^1$, $K^2$, into their dotted positions of Fig. 6, so that as the carriage proceeds into position 2 the blades are standing up at each side of the carriage, clearing the strip of tinfoil F as the carriage rises, and coming into position where as indicated in position 2, they can descend upon it to sever it. Position 3 shows the knives closed again, with the tinfoil severed thereby. This action is produced by the engagement of the dog surfaces K⁰ with the cams K⁴, Figs. 29, 30, thus reversing the action of the linkage K³ and K¹³. The compound leverage acting through the pin and slot connections, makes a very short cam projection sufficient for complete movement of the blade. The knives remain closed, being held in this position by friction produced by the action of the spring K⁶ until the carriage reaches again the cam K¹⁰.

Another agency contributing to the manipulation of the sheet of tinfoil is a spring drag H¹² which may be conveniently mounted on the underside of the hopper, seen in Figs. 8, 9 and 10, but omitted from Fig. 1 to avoid complication. Before severing, the tinfoil was held by the grippers T on two carriages; but after the knife blades have acted the section of tinfoil on a carriage is positively held only by the tinfoil grippers T at the forward edge of the carriage. Thence the sheet extends backward in midair over the carriage to the rear thereof. The rear end of the sheet rests on a transverse bar R¹² of slightly higher elevation and located just in front of the knife blades, which bar later serves a different function in connection with the positioning of the label or second wrapper. In order to hold this rear end of the sheet of tinfoil for controlling its proper assembling with the chocolate bar, the spring drag H¹² is provided, consisting of a small plate pivotally supported on the underside of the hopper as clearly seen in the lower part of Fig. 9 and overhanging the middle of the path of the carriage, as seen in Fig. 8, its bottom edge being at such an elevation as will drag upon each passing bar R¹² yet not so low as to touch the bars T⁵. This elevation may be adjusted by the joint action of the spring H¹³ which tends to throw its edge downward and the screw stop H¹⁵ which limits its downward swing. It may be further adjusted in extent, and slightly in elevation, by the pin and slot connection H¹⁴ seen clearly in Fig. 9 by which it is hung on its support. This spring drag is so placed and adjusted that it rubs over the tinfoil resting on the bar R¹² just about the time that the tinfoil is severed close behind that bar; and this position and the position where the severing mechanism acts are together so fixed that the bar R¹² and the tinfoil resting upon it pass on beyond the influence of the spring drag only when the chocolate grippers have taken their chocolate bar from the holder under the hopper and are descending with it, so that the chocolate and the tinfoil are properly assembled in the cradle below as will be more specifically described hereinafter.

The function of the hopper H and the auxiliary holder below it consisting of the ledges H⁵ and H⁶ is to arrange the bars of chocolate, or whatever other material the machine is operating upon, singly and with great rapidity in succession in a place where they will be taken with precision by the chocolate grippers of the successive carriages. Obviously this feeding must be precisely commensurate with the speed at which the carriages are passing. It must also be executed with sufficient precision so that the grippers do their work perfectly; and it is subject to such difficulties as may arise from the irregularity of the shape of the materials acted upon. In the case that is being described the chocolate almond bars are round on one side and are hubbly on the other. In consequence they cannot be stacked evenly in the hopper; and partly for this reason it has always hitherto, as far as I am aware, been necessary to introduce such bars by hand to any mechanism which has been employed for fully or partly wrapping them. By reason of the unevenness above described successive bars in the hopper lie at angles considerably different from each other; and they sometimes have their edges close together and sometimes separated by a considerable distance. The conception for bringing order out of this disorder consists in providing means for standardizing the position of the lowest article in the stack, utilizing in some degree the weight of the stack to accomplish this, and then lifting the whole of the stack, except the said bottom one, to a position far enough away so that the chocolate grippers cannot connect with any but the said lowest and standardized bar. Another problem, solved by this means, is the prevention of injury to either the chocolate bar that is taken or its neighbor, by rubbing the former against the latter when the bar is taken. Such rubbing, if allowed, would in some instances damage the material owing to the rough and uneven character of the two surfaces that are in contact, the stack being stationary and the withdrawal necessarily accompanied by somewhat of a lateral movement, because the one that is taken from rest has to acquire instantly the speed of the moving train of carriages. As represented in the drawings a stack of chocolate almond bars H⁴ is seen in dotted lines in Fig. 10, and one below them is in the holder ready to be taken by a carriage. The one below is supported on stationary ledges H⁵, on that end of the hopper where the carriages are approaching, and a movable ledge H⁶ on the end of the hopper from which the carriages depart. The stationary ledges are spread apart, to each side, as seen in Fig. 8. The movable ledge which may be in the form of a bar underlying substantially the whole forward edge of the chocolate almond bar, as seen in the same figure, is attached by swinging arms $H^{16}$ to a pivot pin $H^{20}$ on the hopper. Full lines and dotted lines in Fig. 9 show the positions between which the parts $H^{16}$ and $H^6$ are capable of swinging. When this swinging occurs the ledge $H^6$ moves, in the forward direction, out from under the chocolate bar that may have been resting upon it, and so allows that bar to be taken forward and downward in the grip of the chocolate grippers. Such swinging is a very quick movement occasioned by the arm $H^{16}$, which is fast on the pivot rod $H^{20}$, and is controlled by a spring $H^{17}$ and a latch $H^{18}$. The pivoted dog that has the latching surface $H^{18}$ is marked $H^9$ and has on its tail an inclined under surface adapted to be engaged and raised by some part moving with each carriage. The particular part which in the present case is utilized for this purpose is the top of the rods $D^{15}$, on the ends of which are the chocolate gripper jaws and which are capable of up and down movement as previously described (Fig. 3). When these rods have risen to the upper extremity of their travel in order to lift the chocolate grippers to position to seize a chocolate bar, their tops are at a suitable elevation so that they engage and raise the tail of the dog $H^9$ and so releases the latch $H^{18}$ and so permits the spring $H^{17}$ to swing the pivot pin $H^{20}$ and its attached holder bar $H^6$ from the position illustrated in Fig. 10 and in full lines in Fig. 9 to the position illustrated in dotted lines in Fig. 9, thus releasing the chocolate to the chocolate grippers. The restoration of this chocolate supporting ledge $H^6$ must be accomplished immediately afterward so that another bar can be deposited thereon in readiness for the rapidly approaching grippers on the next succeeding carriage. This is accomplished by a lug $C'$ carried on the same carriage whose rods have tipped it, the presence of which as it approaches is indicated in Fig. 9, and the full shape of which is seen in Figs. 16 and 17 in connection with the portrayal of another function which the same part performs. This upstanding finger $C'$ is set at a forward corner of the carriage C and engages the outer end $H^{21}$ of a lever which is pivoted on a vertical axis on the frame near the hopper, thereby swinging the inner end $H^{22}$ of the same lever in the backward direction, so that said inner end engages and swings backward a finger $H^{23}$ that projects rigidly from the pivot pin $H^{20}$, thus turning the pivot pin and swinging its suspended ledge $H^6$ back to its full line position of Fig. 9, where it is held by the latch $H^{18}$ ready to receive another chocolate bar. Meanwhile the rapid descent of the block $D^{19}$ carrying down the chocolate that its grippers D have just seized has taken that block away so that it does not interfere with the relatching.

The placing of a chocolate bar $H^4$ on the holder ledges $H^5$, $H^6$, is accomplished as follows: It is to be understood that a supply of chocolate almond bars is stacked in the hopper H, resting upon retaining fingers $H^{24}$. The shape of the said retaining fingers is seen in dotted lines in Fig. 8 from which it will be understood that the lower end of each is turned inward at an angle of about 60°, conforming to the angle of the end surface of the chocolate almond bar and adapted to support the bottom bar of the stack, by engaging the undersides of its beveled ends. This bar supports all of those in the stack above it. The bottom chocolate bar must now be passed below these fingers $H^{24}$ and left alone upon the holding ledges $H^5$, $H^6$, without disturbing the stack above. The mechanism is therefore designed and operates to depress these fingers far enough so that the bottom chocolate bar, and the stack resting thereon, are supported by the ledges $H^5$, $H^6$; and then to swing the fingers $H^{24}$ outward transversely of the machine, which is to the right and left respectively in Fig. 8, and upward back into their inward-protruding position so as to engage under the next-to-the-bottom chocolate bar; and then further upward so as to lift the whole stack resting on this next-to-the-bottom bar. This leaves the bottom bar separated from the rest of the stack, resting alone on the ledges $H^5$, $H^6$, and ready to be released by them and taken by the chocolate grippers on the carriage which shall next pass.

The fingers $H^{24}$ are flat plates whose lower parts are shaped inward, and whose upper parts are guided in their movement upward and downward by pins $H^{25}$ which project edgewise from their upper portion into vertical guiding slots on the outside of the hopper. For convenience in having these fingers both inside of the hopper, for contact with the successive chocolate bars, and outside of the hopper, so that their up and down sliding motions shall not interfere with the even feeding of the chocolate bars, each finger $H^{24}$ is made of the somewhat peculiar shape illustrated in Fig. 8 where the lower part is seen substantially flush with the interior of the hopper wall, a higher part curves outward at about the level of the pin $H^7$, and the upmost part runs up on the outside of the hopper. The pin $H^7$ plays an important part in the action by which the fingers $H^{24}$ release the bottom chocolate bar, seize the one next above it and lift the remainder of the stack of bars. The small circle representing this pin $H^7$ is shown dotted in two positions, in addition to its full line position, showing a compound motion, effected by rocking arms $H^3$, attached to it by a pin and slot connection, coöperating with a guiding spring $H^8$. The arms $H^3$ are fast on a pivot rod or rock shaft $H^0$ which may be turned by either of two depending arms $H^1$ or $H^2$, whose positions, one on each side of the machine, are seen in end elevation in Fig. 8; and whose side elevations are seen in Figs. 9 and 10. Each moving carriage C has a lug $C^1$ set in position to engage the depending arm $H^1$, thus swinging that arm upward, and lifting the arm $H^{26}$, which being fast on the rear side of pivot rod $H^0$ turns that pivot so that the arm $H^3$ projecting forward from it swings downward,—thus moving the fingers $H^{24}$ downward. As each carriage approaches the hopper its chocolate grippers D rise as hereinbefore described, and one of the rods $D^{15}$, level with the block $D^{19}$ in which the grippers are mounted serves as a lug to engage the lever $H^2$ (Fig. 10) as it passes, and to swing that upward thus turning the pivot rod $H^0$ suitably for swinging the arms $H^3$ upward, and so lifting the fingers $H^{24}$ to their highest position. The stack of chocolate bars held in the hopper is thus manipulated up and down. The action by which the supporting fingers $H^{24}$ engage first under the ends of the bottom bar, and then under the ends of the next to the bottom bar, leaving the bottom bar alone on the ledges $H^5$, $H^6$, is compounded of this vertical oscillation and lateral turning movements of each finger about its moving pin $H^{25}$ as a center, derived from the vertical motion through the action of its shunting spring $H^8$. The pin $H^{25}$ guides the upper part of the finger $H^{24}$ and the lower portion of the finger is guided by a similarly arranged pin $H^7$ which, however, has a wide guide slot $H^{28}$, broad below and narrow above, in which is set the shunting spring $H^8$. The travel of this pin includes its full line position and its two dotted line positions represented in Fig. 8. The shunting spring $H^8$ is so shaped, in the vicinity of the pin $H^7$, that it lies obliquely across the path of that pin, as seen clearly in Fig. 8, and has an opening close below the uppermost position of the pin $H^7$ through which that pin may pass laterally. The shape of this opening $H^{27}$ is most clearly seen in Fig. 10. Upon consideration of Fig. 8 it will now be understood that when the fingers $H^{24}$ move down the pin $H^7$ on each passes down by the end of its shunting spring to its lowest dotted line position, the spring holding it over against that edge of the wide slot which is toward the stack of chocolate bars and yielding enough to let it pass the end of the spring on the inside as seen in Fig. 8. But when the fingers $H^{24}$ move upward the pin $H^7$ on each is deflected in the opposite direction upon encountering the spring, is thrown to the outer edge of the slot as it rises, passing through the other dotted line position and pressing the spring $H^8$ inward until the pin $H^7$ gets high enough to snap through the opening $H^{27}$ into its full line position, where it is held inward by the same spring. The net result is that the fingers $H^{24}$ on opposite sides of the hopper pass downward in substantially straight lines on the inner sides of the wide guide slots and in the positions in which they are closest together; thus holding whatever chocolate bar and stack above it may be resting upon them until such bar rests upon the ledges $H^5$, $H^6$; but when they move upward they describe a curve, outward and in again, separating enough to clear the ends of the chocolate bar that is resting upon the ledges $H^5$, $H^6$, rising past it, and then coming in again above it into position under the bar next above it in the stack, which they engage and raise, with the stack resting upon it. This action, it will be perceived, is compound, being made up of a simple up and down movement of the whole finger, and a lateral movement of the lower part derived therefrom automatically by means of the shunt spring $H^8$ acting on the pin $H^7$.

Although the peculiar shape of individual chocolate almond bars causes individuals to assume positions of irregularity while in the stack, it is important to have the bottom bar level when taken by the chocolate grippers to be wrapped. The fingers $H^{24}$ contribute an important step in the leveling process. At whatever angle the bar next above the bottom bar may be lying as it rests upon the bottom bar, it assumes a level position when it is raised by the fingers $H^{24}$ engaging under its ends, for the reason that the ends of these fingers are of the same bevel as the ends of the chocolate bars, and are themselves level; so that, as they close in under the chocolate bar and rise against it, any part of the bar which is below the proper level is engaged first and is lifted until the whole width of the bar rests against the whole length of the fingers. It is evident that if the stack, when first engaged, by the rising fingers $H^{24}$, were engaged by them only under its forward edge the weight of the stack would hold down the rear edge of the bar until it also found support on the rising fingers $H^{24}$, thus leveling the bar. Then when this bar is later deposited on the holder ledges $H^5$, $H^6$, it will ordinarily be found level with even greater precision than if it had been placed there by the hand of a human operator. The apparatus of the invention, however, provides for yet further correction of position if any should be necessary with irregular shaped articles, because the top of the chocolate grippers D is provided with a lip $D^{22}$ (Fig. 4) projecting inward and slightly upward, as seen clearly at the top of the part D, Fig. 3, so that if the chocolate bar happen to be tipped, its high part will be engaged under this projecting lip, and gradually forced down into level as the grippers D move inward horizontally against it.

A single chocolate bar having thus been made level and ready on the holder ledges $H^6$, $H^6$, and the tinfoil having been spread over the carriage as above described, extending backward from the tinfoil grippers T at the forward edge of the carriage, various parts co-act to place the tinfoil and the chocolate bar in position together on the cradle $C^2$. The latter is a block carried in the center of each carriage having a concave top surface adapted to fit the convex side of the chocolate bar. The apparatus must place the tinfoil in this concavity, and the chocolate bar above it therein, with the tinfoil in such position that the forward and rear edges thereof will come in proper place when folded over the chocolate bar. To this end the tinfoil grippers T, the spring drag $H^{12}$ and the chocolate grippers coöperate with the forward movement of the carriage and its upstanding parts. The movement of the chocolate bar is precise, because it is held in the grippers D, which move forward with the carriage and downward under the positive control of cams and levers. The forward end of the tinfoil sheet is positively controlled, being held by tinfoil grippers T moving with the carriage; and the rear end is under frictional control at first, while the bar $R^{12}$ is passing under the spring drag $H^{12}$. The proper positioning of the tinfoil is accomplished by the adjustment of these parts relative to each other, so that as the gripper D descends from the position illustrated at position 3 in Fig. 1 to that which it occupies in position 4, the tinfoil is at first held taut so as to be laid smoothly on the under side of the chocolate bar, yielding as much as necessary by slipping forward on the bar $R^{12}$, under the spring drag $H^{12}$; and then is drawn downward at the rear while its forward end is held up by the grippers T, and finally is released at its forward end so that it is drawn down, both forward and rear ends, by the final part of the descent of the chocolate-gripper D, which carries the chocolate bar down until at the end the tinfoil rests with its middle part smoothly lining the cradle $C^2$ under the chocolate bar $H^4$ and with its rear part inclined along the face of the rear folder $F^2$, Fig. 4, and with its forward part inclined along the face of the forward folder $F^1$; the forward flap being somewhat longer than the rear flap. By varying the time at which the tinfoil grippers T release the forward edge the length of the forward flap is varied, being shorter if released sooner, because the downward pull of the chocolate bar upon it then begins to move it sooner. The drawing of the tinfoil taut under the chocolate bar may be regulated by adjusting the extension and the tension of the spring drag $H^{12}$.

The up and down movement of the block $D^{19}$ which carries the chocolate grippers is controlled by a rocking arm $D^{25}$. This is connected to it by a pin and cam slot, clearly seen in Fig. 5, so that the oscillations of the lever $D^{25}$ between its full line and dotted line positions throw the gripper holding block $D^{19}$ between its full line and dotted line positions which represent the extremities of its motion upward and downward. The arm $D^{25}$ is fast on a rocking pivot pin $D^{24}$ to which is also fastened the piece having the two fingers $D^1$ and $D^{10}$. As these fingers and the arm $D^{25}$ are short and flat and thin, and as the stresses imposed upon and transmitted by them are in the direction of their width, in which direction they are stiff, they are so light that they have exceedingly little inertia. In fact, the inertia may be considered negligible; and a high speed of operation of these parts is attained without noticeably impeding the action of the machine as a whole. In this friction is also minimized by the fact that the finger $D^1$ swings in the direction of travel of carriage and starts the propulsion of the grippers upward with an acceleration which is slow at first and at the beginning is almost in the same direction in which the finger is moving from the dotted line position of Fig. 5. When each carriage is inverted on the underside of the chain, chocolate grippers D being temporarily out of use may fall out of proper position, and may not fully return as the carriage goes upward around the curve. In order to seat the grippers preliminarily in their "downward" position (illustrated in Fig. 4) as they pass up around through position 1, a cam pin $D^0$ (Figs. 29, 30) may be fixed so that it will engage the finger $D^{10}$ (Fig. 5) if that be upstanding at all, and will throw it down so that the finger $D^{10}$ and its connected parts occupy the dotted line position of Fig. 5, which is the position herein called the "down" position. With the chocolate bar grippers in this position they are ready to start on their cycle of operations, the first of which, occasioned by the finger $D^1$ in its dotted line position engaging the cam $D^3$ as the carriage moves onward, causes the finger to be swung to and held in its full line position, thus lifting the block $D^{19}$ to its upward limit, and holding it and the chocolate grippers raised throughout the length of the cam $D^2$, which continues while the carriage is approaching the hopper and until the grippers have been projected inward to seize the chocolate bar. By thus raising the grippers at the place where the cam $D^2$ begins they can be made to describe a motion which does not interfere with the web of tinfoil lying between them, inasmuch as they rise vertically in their spread position to above the level of the tinfoil and are afterward during the continuance of the cam $D^2$ projected inward by the swinging of the lever $D^3$ under control of the pin $D^4$ and cam $D^{21}$, as above described. The latter cams $D^{21}$ are made long enough and are so placed that their ends are not reached and the chocolate grippers allowed to fly out until the cams $D^{23}$ have completed their action of throwing the grippers down so that the chocolate bar which they hold rests completely in the cradle $C^2$. During this downward movement the springs $D^{16}$ are pressing the heads $D^{18}$ of the chocolate grippers outward against the vertical faces $D^{17}$ of the levers $D^3$ (Figs. 2, 3) so that friction is generated as the head $D^{18}$ slides downward on the face $D^{17}$, sufficient to overcome all action of gravity. This causes the downward movement of the grippers, carrying the chocolate bar, to be executed under perfect control of the cam $D^{23}$ and the cam finger $D^{10}$ against which it is acting. Thus the rate of descent is predetermined and regulated and the sheet of tinfoil is relieved of all possibility of irregular stress which might otherwise result from action of gravity as the gripper and bar descend upon it.

The operation of wrapping of the tinfoil about the chocolate bar in the longitudinal direction is completed by the action of the folders $F^1$, $F^2$, which are seen clearly in Fig. 4. This operation cannot be performed upon the subject matter upon which the machine which is being described was designed to operate, viz., bars having an uneven and hubbly top due to the projection of almonds irregularly above the level of the chocolate, by any apparatus previously existing as far as I am aware, but for this purpose I have devised the particular feature of the invention which is connected with the surface and style of operation of the folders. The tinfoil which is to be wrapped over this surface is delicate by nature, and is easily torn. This portion of the problem is solved by providing elements, which are the folders, each of which conveys bodily a definite portion of tinfoil and lays it upon that portion of the chocolate bar which is to be covered, pressing it down to such uneven and irregular distances as the irregular surface of the bar requires. This is accomplished by hinging the folder near the edge of the bar and providing the folder with a surface substantially equal in area to the area of the tinfoil it conveys, and making that surface of a character which is capable of applying its pressure at different elevations simultaneously. In a mechanical sense, the action is very simple in that the folder $F^1$ or $F^2$ merely swings over the top of the chocolate bar, turning on hinges $F^0$ seen clearly in Fig. 4; and the surface which thus presses the tinfoil down upon the uneven surface of the chocolate bar is composed of a multiplicity of projecting flexible points, having individually sufficient stiffness to push the tinfoil down solid, and sufficient resilience to yield if one happens to encounter an elevated portion of the chocolate almond bar before the end of the travel of the folder is reached. For this purpose rubber or any suitable material may be employed, rubber being particularly advantageous because it exerts some degree of friction on the tinfoil and thus helps hold it from slipping.

The folders $F^1$ and $F^2$ are swung on their hinges $F^0$ by vertical links $F^3$ seen in Fig. 4 which are in turn operated by levers $F^5$ extending horizontally in the fore-and-aft direction under the carriage, pivoted at $F^{10}$ and carrying cam rollers $F^{11}$. The location of these parts midway of the carriage is seen in Fig. 3. It will be understood that one of the upright links $F^3$ is behind the other. One of the levers $F^5$ with its cam roller $F^{11}$ is at the left, as seen in Fig. 3, this lever and roller being represented also in Fig. 4. The other lever $F^5$ is at the right in Fig. 3, although its roller is not seen being removed by the section; and no part of this second lever $F^5$ is seen in Fig. 4 because it is removed by the section, but it corresponds symmetrically with the lever $F^5$ that is there seen. As the carriage progresses, moving in the direction of the arrow in Fig. 24, the roller $F^{11}$ that is seen in Figs. 3 and 4 engages the cam $F^4$ and thus swings the forward link $F^3$ upward, causing the forward folder $F^1$ to swing over upon its hinge $F^0$ and carry the tinfoil down upon the chocolate bar. As the cam $F^4$ is passed the other roller $F^{11}$ begins to be acted upon by the cam $F^6$, turning the rear folder $F^2$ with its part of the sheet of tinfoil down upon the top of the chocolate bar, overlapping the forward flap of tinfoil. These motions can be in part simultaneous as indicated at position 4 in Fig. 1, the forward folder rising as the rear folder descends.

The tinfoil and chocolate bar having been properly positioned with respect to each other by the mechanism and attachments above described, the folds of tinfoil will fall upon the top of the bar, each extending a little past the middle and both projecting beyond the ends of the bar, in the transverse direction of the machine, to the full extent of the width of the sheet of tinfoil. Thus they include the grippers D in their wrapping as well as the chocolate bar, but the ends of the wrapping are left open in the form of a tube. It is only after this has been accomplished that the cam $D^{21}$ ends, allowing the springs $D^{16}$ to withdraw the chocolate grippers through the open tubular ends of the tinfoil wrapping. By thus holding the grippers in position until the folding has been accomplished the folding is made precise. The pressing of the tinfoil by the folders leaves it in such position that it retains its shape; and the bar rests on the cradle by gravity while the grippers are withdrawn and until they return in the operation now to be described, in such a manner as to re-position the bar accurately if by any chance it has moved in the interval. Having been thus withdrawn laterally, the chocolate grippers are raised a little by the cam finger $D^1$ encountering a pin $D^5$, Figs. 5, 29. The pin is positioned at such an elevation, as seen in Fig. 29, that it does not raise the chocolate grippers to their full limit of travel. It raises them in fact only sufficient to get them above the upper wrapping which is in place on the chocolate bar, after which the cam $D^6$, Fig. 27, is encountered and begins pushing those grippers inward, and the cam $D^4$ is encountered and begins pushing them downward, so that they describe an inward and downward motion upon the top of the tinfoil until they arrive at the upper corners of the chocolate bar, pressing and crushing the tops of the extending ends of the wrapper downward and inward until they lie snugly against the beveled under-cut ends of the chocolate bar, the part D thus reaching a position somewhat the same as the dotted line position in which the part N is shown in Fig. 3. This tucks the ends of the top of the wrapper neatly down about the ends of the bar and leaves it only necessary for the sides and bottom of the wrapper to be folded up in order to complete the enwrapping of the bar with tinfoil. The ends of the cam $D^6$, Fig. 27, having been reached with the completion of this tucking movement, the chocolate grippers are again retracted laterally, by springs $D^{16}$ to the position illustrated in Fig. 3, and the end folders N act by swinging upward from the full line to the dotted line position in which one of them is shown in Fig. 3. These end folders are shaped to conform to the shape of the end of the chocolate bar, and are compound. They are pivoted at $N^0$ as shown and have an advance flap $N^4$ which is of a suitable size so that when swung upward about the pivot $N^0$ it lies flat against and covers the inclined end of the chocolate bar, as shown in the dotted line position; and it is provided with a spring $N^3$ which tends to keep this flap in a position about 60° in advance of the part N as shown in the full line position in Fig. 3. The part N, and with it its advanced flap $N^4$, are swung upward by the tail of a lever $N^1$ pivoted on the carriage as seen in Fig. 4, whose depending pointed end is normally drawn forward by a spring $N^{10}$ as there seen, in position so that they engage the cams $N^2$ on the cam plate M. As the carriage is dragged past these cams the depending point of lever $N^1$ is swung to the rear, thus raising the upper end of the lever, which rubs on the backs of the end folders N, and as it swings up lifts them from their full line to their dotted line positions. In this movement the leading plate $N^4$ first folds the bottom part of the projecting tinfoil up against the end of the chocolate bar, and then holds it flat there during compression of its spring $N^3$ while the main part of the end folder N continues its swing and swings downward and inward, over and to the top of the end of the chocolate bar, carrying with it that part of the end flap of the tinfoil which remains projecting above the level of the top of the chocolate bar after the advance part $N^4$ has acted. It will be understood that the rubber facing $N^5$ of the folder N yields as much as may be necessary for this, so that it can act equally upon all the bars, even though there be considerable diversity in the actual level of that part of the tops of different bars. Upon completion of this movement the cams $N^2$ are passed. The lever $N^1$ thus released is drawn back to its position illustrated in Fig. 4 by the spring $N^{10}$ there shown; and the chocolate bar is left lying on the cradle $C^2$ completely enwrapped with tinfoil with the ends of the wrapping tucked down in, folded around, and lying close upon the uneven top.

By reason of the certainty and uniformity with which these operations are executed by the mechanism, and particularly by reason of the certainty of execution of the tucking operation, a narrower strip of tinfoil may be used than has been found possible when the bars are wrapped by hand, making a saving in the case of the particular machine illustrated, of about five eighths of an inch in width, and also permitting the use of thinner stock.

The tinfoil is to be covered by a second wrapper of paper, which may protect the tinfoil and at the same time bear the name and trade mark of the maker of the chocolate bar, and which is herein referred to as the label. The supply of labels is kept in a stationary label box O placed above the path of the carriages, in the form of cut sheets arranged face downward. Inasmuch as the chocolate bar, at position 4, is lying on the cradle $C^2$, the mechanism has to take a single one of the labels from the overhead supply, and pass it completely around the chocolate bar. The general scheme of operations by which this is accomplished is that the mechanism raises the chocolate bar, holding it by its ends, and then after the chocolate bar has passed the label box, seizes the bottom label by its forward end, spreads it under the chocolate bar while in mid-air, and then forces the bar down upon it into the cradle. Afterward it folds the rear flap of paper over on the bar and then the forward flap, to the edge of which a thin strip of paste has meanwhile been applied, presses the two parts into position, and applies auxiliary pressing directly to the paste line until the paste has set. In carrying out this operation it is incidentally necessary to separate with certainty and regularity a single label from the bottom of the pile of labels, and move it downward therefrom; to provide a measured supply of paste and means for applying that with uniform precision to the edge of the label; and also, in view of the springy character of the paper of which the label is composed, to hold down the rear flap after it has been turned by its folder and that folder has been removed, while the leading flap is being turned down, and also to make sure that the flap which is turned down last is smoothed out so that the paste holds it at its extremity when in flat position; and also incidentally to provide that this edge of the flap last to be folded is properly positioned close to the edge of the top of the bar. The various parts of the mechanism which interact with each other for accomplishing these operations will now be described, beginning with the label box and the mechanism for getting a label into position to be handled by apparatus moving with the carriage.

The label box O is shown in Figs. 1 and 11–13. It comprises essentially a holder for a stack of labels consisting of upright walls inclosing an area of the same size and shape as a label, so that labels in the stack are held in uniform position. A little less than half of the bottom $O^4$ of the box is present, the remainder being cut away except that shallow lips or shelves $O^7$ are left at each side as seen in Fig. 13 and a narrow shelf $O^9$ at the forward end. These are sufficient to hold the stack of labels in the absence of any disturbing influence, and may be so arranged that they will hold a stack down to the very last label. It will be obvious that the thickness and stiffness of the paper are elements which have to be considered in designing this part of the apparatus, the important thing being to have the sheets so supported that the sheets will rest with certainty at the level of the bottom $O^4$ until the bottom sheet is drawn downward by the action of a suction current of air through the adjacent grating $O^3$. This grating is close under the open portion of the bottom, and is set at an incline across the opening to a passage $O^2$ through which air is constantly being drawn by any suitable suction means such as a fan, $O^1$. The bottom label of the stack is affected by this suction whenever a current of air is passing in through the grating $O^3$. This grating is arranged, as is clearly seen in Fig. 3, so that it is located under the middle forward portion of the stack of labels, not reaching completely to either side nor to the forward edge. In consequence when a label is sucked down from the stack the central forward portion of the label is the part which is drawn; and the label bellies downward, as it descends, thus slipping out easily from under the stack above it resting on the narrow shelves $O^9$ and $O^7$. Particular attention is called to the shape of the side ledges $O^7$, which recede from a maximum projection in the forward part to zero projection at the rear, where the bottom $O^4$ of the label box is intact. In consequence a label can easily be drawn by the suction of air so that it occupies the position shown in dotted lines in Fig. 1, with the rear portion of this label resting on the bottom $O^4$ and with its forward portion tipped down at the incline and held close against the grating $O^3$ by the suction of the fan $O^1$. It is to permit this that the ledges $O^7$ are not carried back to the bottom $O^4$ at full width. The arrangement of the top of the upper part of this grating, in close proximity to the underside of the stack of labels, brings it about so that only the forward end of the label is disturbed, there being no pull on the rear end of the label, and as a result of that the forward ends of the labels as they come down one after another are positioned in precisely the same place. This is partly because the labels in the stack fit closely between the rear and forward walls of the holder O, so that the distance from the bend in the label at the top of the grating to the forward edge of the grating is always the same as the distance from said top of the grating to the forward wall of the box. The label, being thus held in the position shown in Fig. 1, is so located that it will be seized with precision by the label grippers R as hereinafter described and will have its flap in the proper place on the bar when folded about it.

In order to transfer the label, seen depending from the bottom of the label box O in Fig. 1, to a position under the chocolate bar, last herein described as lying in position 4 in Fig. 1, the apparatus carries the chocolate bar under the label and at the same time raises it to substantially position 6, at which point label grippers R which have been resting quietly in the rear of the carriage seize the depending end of the label and by a quick forward movement, sliding on the carriage, from right to left as shown by the arrow in Fig. 1, at position 6, and from the dotted line to the full line position portrayed in position 6 therein, carry the leading edge of the label under the raised chocolate bar, after which the chocolate grippers carry the chocolate bar downward until it and the label under it rest in the cradle as in position 7. The chocolate grippers, which were left retracted laterally at the termination of cam $D^6$, Fig. 27, in order that the folding of the ends of the tinfoil might be accomplished by the end folders N, are immediately afterward moved inward again by cams $D^7$, Fig. 27, until they grip the chocolate bar as it lies at rest on the cradle $C^2$. The cams $D^{13}$ are positioned (Figs. 29 and 30) so that they engage the lever $D^1$, and then lift the bar to its limit, after the chocolate bar is well in the grip of the grippers D. As soon as the chocolate bar has passed the depending end of the label, held on the suction grating $O^3$, a rapid movement is executed by the label grippers, traveling as a sub-carriage on the carriage between the two positions marked R in Fig. 1. This mechanism is seen in Figs. 2, 3 and 4 and consists of a sub-carriage mounted on each carriage C, traveling on guide-ways $R^{10}$ which extend in the longitudinal direction of the machine, one at each side. Two standards $R^{11}$, one on each guideway, are adapted to slide forward and back on these ways; and are connected at the top by a cross bar $R^{12}$ which constitutes a sort of frame holding them together and promoting uniformity of movement; and at the same time constituting an under support or lower jaw for the label when it is gripped. In the top of each standard is the upper jaw $R^{30}$ for gripping the label, comprising a loose piece set in a slot $R^1$ extending vertically and horizontally inward. This jaw $R^{30}$ is of the peculiar shape shown in Fig. 3, comprising a body movable loosely in the slot and a projection $R^{31}$ extending thence inward toward the center of the carriage for gripping the label by pressing it down upon the top of the bar $R^{12}$. For this purpose, and for another function which will presently appear, a flat spring $R^6$ is provided overlying the upper jaw $R^{30}$ and pressing it down as a whole, the inward projection $R^{31}$ toward the bar $R^{12}$; and the body or outer portion $R^{30}$ upon a little ridge $R^5$ which in the construction illustrated is merely a round fixed pin transfixing the lower part of the slot. A cross bar or keeper $R^{13}$ prevents this loose jaw $R^{30}$ from escaping accidentally from its slot; and a vertical lever $R^2$ arranged on the side of the carriage is in position to press the piece inward from the full line position portrayed in Fig. 3. When it so moves the upper jaw $R^{30}$ has to slide over the ridge $R^5$. The under part of the jaw is formed with an inclined face or cam as at $R^{14}$, so that as the jaw is pushed inward it must rise against the spring $R^6$ riding over the ridge $R^5$ and through the dotted line position, seen at the top of Fig. 3, until the end of the cam $R^{14}$ has passed the ridge $R^5$ and the recess $R^{15}$ has reached it, so that the jaw can snap down into position with the ridge $R^5$ incased in this recess. The dotted lines show the position at end of the cam $R^{14}$, when the recess $R^{15}$ has nearly reached the ridge $R^5$. The inner end $R^{31}$ of the jaw is then upstanding in air, inward from its full line position of rest. Upon being pushed a little farther inward, the jaw can and will be snapped down with its end portion $R^{31}$ upon bar $R^{12}$. This is the action by which the label is seized as the carriage passes the label box. It will be observed that the rather complicated movement of the jaw by which it is made to rise up to reach in from its position of rest at the side, and to descend upon the leading end of the label, is accomplished by the very simple action of swinging the lever $R^2$ on its pivot. This in turn is accomplished by the cam $R^3$. The shape of this cam is as illustrated in Fig. 24 where it will be seen that the greater part of its surface is at a gradual incline while at the end there is a steep incline. The gradual part of this cam surface causes the lever $R^2$ to swing slowly, and as its upper end moves inward, pushing the jaw $R^{30}$ at a corresponding rate, the ridge $R^5$, coöperating with the restraining action of the keeper $R^{13}$ causes the inner end of the jaw to swing upward so rapidly that its movement may be likened more to an elevation of the end of the gripper jaw $R^{31}$ rather than to an inward movement; but when the end of the cam $R^3$ is reached its steep incline completes the swing of lever $R^2$ rapidly, giving a final throw to the jaw $R^{30}$ that carries its recess $R^{15}$ into registry with the ridge $R^5$ with great rapidity, with a quick further inward projection, and at the same time depression of the point of the jaw $R^{31}$ with great rapidity. Consequently the end of the cam $R^3$ is so positioned that the jaw R snaps inward and downward, with the terminal motion just described, precisely as it is passing the leading end of the label depending from the grating $O^3$. The jaws $R^{30}$ on both sides of the carriage having thus seized the leading edge of the label simultaneously, forward movement of the jaws drags the label from its waiting position, the middle of its forward edge resting on the sub-carriage bar $R^{12}$.

The label is then immediately drawn underneath the chocolate bar by a forward movement of the sub-carriage on its ways $R^{10}$. This is effected by levers $R^7$ which are pivoted at $R^{20}$, Fig. 3, and are at their upper ends attached by a pin and slot connection to the standards $R^{11}$. The cams $R^3$ on a cam plate M, Fig. 24, are so placed that the depending ends of the levers $R^7$ engage them immediately after the jaws have snapped inward and downward on the label. The cam being stationary and the carriage moving, the upper ends of the levers $R^7$ are thrown forward with respect to the carriage; and the leverage about the pivot $R^{20}$ is such that the parts $R^{11}$, $R^{12}$, of the sub-carriage are thrown forward at vastly greater speed than that at which the main carriage C is moving, so that in a very brief space of time after the jaws $R^{30}$ have snapped in and down upon the label at position 6, they have drawn the leading end which they have thus seized from the rear to the forward end of the carriage, and thus have spread the label under the elevated chocolate bar. In order that this movement may be executed the bar $R^{12}$ should be maintained by the uprights $R^{11}$ at an elevation a little less than that of the bottoms of the chocolate grippers and chocolate bar. In fact, the cam $D^{13}$ may be designed so that the chocolate grippers D do not reach their highest elevation until after passing the label end depending from the screen $O^3$, but do reach it soon afterward, so that the bar $R^{12}$, which is at the same elevation as said depending label under which the chocolate grippers have passed, can immediately pass under them. When this has been done the end of the cam $D^{13}$ is reached and, while the cams $D^7$ are still holding the chocolate grippers inward with the chocolate bar in their grasp, the cams $D^{14}$ are reached, whose effect is to move them and the chocolate bar down, until the latter rests in the cradle $C^2$ with the label smooth beneath it and with forward and rear flaps of the label upstanding. The label being now held by its frictional compression between the chocolate bar and the cradle, the label jaws may release their hold. For this the parts herein previously called tinfoil grippers T are utilized. These are located at the forward edge of the carriage, as seen in Fig. 2, and are capable of swinging transversely of the machine as seen in Figs. 32, $32^a$ and $32^b$. The position to which the levers $R^7$ move the sub-carriage is close against the rear side of these tinfoil grippers. For releasing the label, lugs $T^4$ are fixed on the swinging levers or tinfoil grippers T in such position that when those levers T are in their inward positions, as illustrated in Fig. 32, these lugs stand just within the positions at which surfaces $R^{16}$ on jaws $R^{30}$ arrive when they travel from the rear to the forward end of the carriage. At the end of the cam plate M are cams $R^9$ which engage the depending ends of the tinfoil grippers T and swing them inward, thus throwing their tops outward, in the course of which movement the lugs $T^4$ engage the surfaces $R^{16}$ of the label jaws $R^{30}$ and carry them out to the position illustrated in full lines in Fig. 3. It will be noticed that the recess $R^{15}$ has a cam face which permits this action. The cam $R^9$ is so located that this action takes place when the approach of the chocolate bar to the cradle C has rendered further holding of the label by the jaws $R^{30}$ unnecessary, but care should be taken to place this cam late enough so that there is no opportunity, after the release has occurred, for the final movement of the chocolate bar into the cradle to draw the leading edge of the label downward beyond the position where its upstanding end ought to be to receive a due deposit of paste from the mechanism now about to be described. In the machine illustrated the release does not occur until the chocolate bar has been fully seated. Consequently the leading edge of the label remains upstanding above the sub-carriage bar $R^{12}$ to a predetermined amount, which in fact is about the length that was seized by the label grippers.

The paste-applying mechanism is a wiper P swinging over the path of the carriages C next beyond the place where the label and chocolate bar have been seated in the cradle. It combines in itself the functions of receptacle for the supply of paste, of feeding and measuring devices for the quantity of paste destined for each label, and of brush by which the paste is applied. Consequently it is wide enough to extend across the full width of the label; is hollow to hold the paste, with a plunger to force and measure its exudation; is shaped like a dull wedge whose edge is pierced by a thin, paste-delivering slot extending transversely of the machine; and swings in the longitudinal direction of the machine. The plunger $P^{15}$ is a simple, closely fitting block pressing down upon the paste in the interior of the wiper P, and the invention comprises mechanism by which this plunger is forced inward periodically to a measured extent, thereby displacing through the slot $P^{17}$ a measured volume of paste and leaving said displaced paste in position where it may be automatically deposited on the leading end of the label as the end of the wiper swings past it. Fig. 1 shows full line and dotted line positions between which the wiper may swing. The dotted arc of travel of the end of the wiper is over a portion of the chain A where the carriage is traveling horizontally and extends up high enough above the carriage so that while the wiper is in its full line position the leading end of the label passes under it without contact, and extends down low enough so that when the wiper swings along the dotted arc into its dotted line position, its lower edge rubs upon the label edge. This movement is effected by a spring $P^3$, the location of which is seen in Fig. 1 and depends upon the release of a latch $P^2$ engaged in a notch shown clearly in Fig. 19 in a hub $P^4$ on the main supporting pivot $P^{21}$. This is done by the upstanding pin $D^4$ on the top of the chocolate gripper mechanism near the rear of the carriage, which engages a lever $P^1$ seen in Fig. 18, whose other end engages an inclined surface seen in Fig. 19 on the tail of the latch $P^2$, and so releases the latch. As each carriage comes along the engagement of its upstanding pin $D^4$ with the outer end of the lever $P^1$ swings the inner end of that lever backward so that it releases the latch $P^2$. This allows the spring $P^3$ to swing the paste-applying receptacle rapidly forward, transferring the line of paste therefrom by a wiping action to the upstanding end of the label. After the carriage has passed, the lug $C^1$ on the forward part of the next carriage engages the outer end of another lever $P^5$ (Fig. 17) pivoted at $P^{20}$ which swings the wiper back to its full line and latched position. During this return swing a measure of paste is expressed through the slot $P^{17}$ by a measured progression of the plunger $P^{15}$ into the receptacle. The mechanism for this is shown in Figs. 14–20. The piston is mounted on two stems comprised of racks $P^{14}$ which are engaged by two pinions $P^{13}$ on a shaft $P^{16}$ driven by a ratchet wheel $P^7$, rotation of which results in moving the piston up or down. This ratchet wheel is rotated step-by-step a short distance at a time.

The combined paste receptacle and applier has hubs $P^4$, one of which contains the notch for the latch $P^2$ as above explained and as seen in Fig. 19, and has projecting pins $P^{21}$ that constitute pivots seen in Figs. 14–17 on which the wiper swings. The limit of this movement to the right is seen in Fig. 1. On this movement a quantity of paste is expressed, measured, adjustably, by a lost motion mechanism. A ratchet wheel $P^7$ is fast on the same shaft $P^{16}$ as the pinions $P^{13}$ that operate the rack $P^{14}$; and this wheel is actuated by a pawl $P^6$ (Fig. 14) which is carried on a link $P^8$, being spring pressed against the edge of the ratchet wheel $P^7$ as seen most clearly in Fig. 14. The link $P^8$ is pivoted on the same axis as the ratchet wheel $P^7$, and near its free end carries, in addition to the pawl, a pin $P^9$ which is engaged in a vertical slot in a horizontally sliding block $P^{10}$. The block $P^{10}$ has also a horizontal slot into which a stationary feather or guide boss $P^{11}$ fits, which being fixed on the frame of the machine permits the block $P^{10}$ to slide only in a rectilineal horizontal direction. The sliding block carries a screw $P^{12}$ which projects into the end of the horizontal slot and can be adjusted longitudinally of the slot so as to have the effect of lengthening or shortening said slot, thus lengthening or shortening the distance which the block $P^{10}$ may slide on said feather $P^{11}$. As both the pawl $P^6$ and the pin $P^9$ are slightly above the level of the axis $P^{21}$ their motion and that of the block $P^{10}$ is in the opposite direction to that of the paste wiping edge $P^{17}$.

A stop spring $P^{16}$, in the nature of a pawl, prevents backward rotation of the ratchet wheel $P^7$ during the normal operation of the machine; but the pawl $P^6$ is capable of feeding the ratchet wheel in the forward direction, so as to force the piston $P^{15}$ down, whenever the link $P^8$ swings about the axis of the ratchet wheel $P^7$. It is to be understood that the friction of the block $P^{10}$ on its guiding feather $P^{11}$ is relatively little, and that the effort required to rotate the ratchet wheel $P^7$ is relatively great, owing to the force required to expel a plastic solid such as paste through a narrow slot $P^{17}$. Consequently whenever the wiper swings from the position of Fig. 15 to the position of Fig. 14, moved by lug $C^1$ and lever $P^5$, the slip comes on the feather $P^{11}$ and the link $P^8$ retains unchanged relation to the body of the wiper P, until the position illustrated in Fig. 14 has been reached where the end of screw $P^{12}$ has encountered the end of feather $P^{11}$ so that the block $P^{10}$ cannot move farther to the left, thereby holding also the pin $P^9$ on the free end of link $P^8$ from moving farther to the left (Fig. 14). But as the main part of the wiper must continue in motion under the influence of the lever $P^5$, and in so doing carries the upper end of link $P^8$ with it, the effect is to turn the link $P^8$ over to the left around $P^9$ as a center, thus carrying the center of the ratchet wheel $P^7$ over to the left around $P^9$ while its periphery is held by the pawl $P^6$ at substantially the location of the pin $P^9$. This amounts to rotating the ratchet wheel about its moving center somewhat as a carriage wheel rolls on the ground. The rotation thus induced is accompanied by a proportionate forcing of the plunger racks downward, causing paste to exude at $P^{17}$. The measure of this rotation is controlled by the adjustment of the screw $P^{12}$. When this is inserted more deeply so that the motion of the block $P^{10}$ is arrested sooner, the portion of the entire travel of the wiper which produces no effect because of the slip on the feather $P^{11}$ is less, and the portion of its entire travel which is consumed in the throw of the link $P^8$ with incidental rotation of the ratchet wheel $P^7$ is greater. It will be obvious that this can also be adjusted by making suitable adjustment of the length of lever $P^5$ and of the location of the lug $C^1$ which actuates it. For purposes of clearness in the drawing the size of ratchet teeth in the ratchet wheel $P^7$ are somewhat exaggerated. These teeth may be made as small as desired, or an equivalent one-way friction feed might be substituted, or a train-reducing gearing introduced, so as to make each step of the feeding as small as desired, or more precisely commensurate with throw of the link $P^8$.

When it is desired to re-fill the receptacle the spring pawls $P^{16}$ and $P^6$ may be lifted out of action and the plunger may be withdrawn by rotating the ratchet wheel in the opposite direction. The area of the part of the paste receptacle occupied by the plunger is so much greater than the area of the slot $P^{17}$ through which the paste exudes that an exceedingly slight advancement of the plunger therein is sufficient to force out the necessary amount of paste. This action is effected as the applier is swung back to the full line position of Fig. 1 in which, as above described, it comes to rest a little above the lever at which the leading edge of the label will pass under it. As soon as that edge has passed under it, the paste applier swings forward, and the paste upon its end is transferred by rubbing over the label.

The cam $F^7$ is so located on the cam plate M that it engages the pin $F^{11}$ which operates the rear folder $F^2$, either while the paste is being applied to the leading flap of the label or at about that time, it being illustrated in the drawing as occurring just afterward, with the result that as the carriage passes from position 7 to position 8 in Fig. 1 the folder $F^2$ is turned down to the location illustrated in position 8 by the same mechanism that has been previously described herein, thus laying the rear flap of the label smoothly down upon the top of the chocolate bar. The paper of which the labels are made has a characteristic elasticity, such that the paper would follow the folder $F^2$ up again to some extent if allowed to do so. The invention, therefore, provides means for holding the flap in its turned down position while the leading flap is turned down upon it. The mechanism for doing this is shown in Figs. 2, 3, 4, 37, 38 and 39, and consists of slender tongues S, S, which are mounted at the rear of the carriage so as to slide in the fore-and-aft direction of the machine in ways $S^0$, from the retracted position shown in full lines in Figs. 2 and 37 to the projected position shown in dotted lines. When projected they overlie the rear part of the label flap that has been turned down by the folder $F^2$. The shape of one of these tongues is shown in plan and elevation in Figs. 39 and 37, where its upturned end can be seen. The tongues fit loosely in their ways $S^0$ and are propelled in and out therein by rock arms $S^1$ fast on the top of a vertical rock shaft $S^2$ to which arms the tongues are joined by pin and slot connection, so that this rock shaft can swing about its axis $S^2$ between the full line and dotted line positions, seen in Figs. 2, 37 and 39, thus moving the tongues between their retracted and projected positions. The fit of the pin and slot connection is loose enough, so that when the tongues are projected they are held loosely. As a result of this and because of the upturned ends, the tongues can be projected inward over the label flap after the latter has been turned down, while it is still being held down by the rear folder $F^2$ and can ride over any unevenness in the top of the almond bar which may be caused by the chance location of almonds within their line of travel. At the same time the looseness is not such as to permit the tongues to be elevated more than may be requisite to slip easily over such roughnesses for the reason that they must hold the label flap down. The top end of each vertical rock shaft $S^2$ is seen in Figs. 2, 37, 38 and 39, and its bottom end in Figs. 3, 4, 37 and 38, the intervening parts being omitted from the drawings in order to avoid complication, but it will be understood that it is journaled in any suitable way on the carriage plate C. The bottom part of this shaft has a projecting arm to which a spring $S^5$ is attached, normally drawing the shaft and fingers S into retracted position. Another projecting arm or pin $S^3$ on each shaft $S^2$ is located in such position as to engage one of the cams $S^4$ on cam plate M, Fig. 24, after the folder $F^2$ has turned down the rear flap of the label. As the carriage moves forward the stationary cams $S^4$ swing these rock arms $S^3$ to the rear, thus swinging the upper rock arms $S^1$ forward, they being on the opposite side of the rock shaft $S^2$; and the rock shaft is held in this position against the tension of spring $S^5$ until the cams $S^4$ are passed, which is not until the folder $F^2$ has risen and the folder $F^1$ has descended so as to hold down the forward flap with the rear flap of the label under it. At that time the cams $S^4$ terminate, leaving the springs $S^5$ to turn the rock shaft $S^2$ backward, withdrawing the tongues S from between the two flaps of the label.

Cams $F^8$ are so located on the cam plate M, Fig. 24, that they engage the other pins $F^{11}$, which operate the other or forward folder as soon as the tongues S have been projected to their positions over the rear flap of the label. This produces the condition shown in position 9 in which the main body of the leading flap is laid flat upon the rear flap.

It is one feature of the invention to provide apparatus which can be operated at a high rate of speed. To that end the folders are made relatively short, so that the width of neither of them is sufficient to cover the entire width of the chocolate bar; because the space thus saved at the free ends of the folders saves materially in the height of parts and in the rapidity in which the operations may succeed each other where the folders are concerned. It is also desirable that the label should project above its folder $F^1$ in order that the paste may be deposited upon it with a wiping swing of the paste applier. It is also desirable, for the proper positioning of the tinfoil and chocolate bar and the label with reference to the chocolate bar, that the distance which these materials move in mid-air during their assembling should be a minimum, in order to give a more perfect control. There are other reasons why the folder $F^1$ is made shorter than the full width of the flap which it folds down; and why the invention provides another appliance for sealing the edge of the label flap, at the extreme edge of the top of the chocolate bar.

During this sealing process it is desirable that the whole body of the flap be held down upon the chocolate bar in order that no springiness of the paper should interfere with the perfection and precise location of the sealing. It is also desirable to avoid the necessity of having a cam around the curve at the end of the machine in order to keep folder $F^1$ down. A latch W is therefore provided, seen in Figs. 33 and 34, in its inverted position just before the chocolate bar $H^4$ is dropped out, it being understood that Fig. 34 is a fragmentary view showing parts in the center of the carriage which in Fig. 3 were removed by the section, although the parts are in slightly different position. This latch is a post depending from the carriage plate C, to which it is pivoted at $W^2$ so that it can swing transversely of the carriage against spring $W^3$ toward the left in Fig. 34. Normally it occupies the straight downward position shown in Fig. 34 beside the lever $F^5$ which controls the forward folder $F^1$. In actuating that folder to turn down the label flap, the lever $F^5$ rises from the dotted line position shown in Fig. 33 to the full line position there shown, incidentally deflecting the latch W to the left against the spring until the latch snaps back to the right, thus holding the lever $F^5$ in the position illustrated, and thus holding the folder $F^1$ down on the top of the label on the chocolate bar. Cams $W^1$ and $W^4$, the former on the top and the latter on the bottom of the cam plate M, are so placed as to engage and actuate this swinging post. The cam $W^1$ deflects it to the left and holds it so deflected while the carriage is passing the position where the folder $F^1$ is turned down for the tinfoil folding, so that at this time this latch is held out of action. Cam $W^4$ similarly deflects the swinging post when the entire operation of sealing has been completed and the wrapped bar is ready to be discharged from the machine, the effect this time being to release the lever $F^5$ which it has been holding, and so to allow the folder to swing to its upturned position, thus letting the completely wrapped bar drop from the machine. The operative face of the latch is, however, so located that in the meantime, while this folder $F^1$ is held down by the latch, the latch does not maintain the folder in its extreme depressed position, but holds it close thereto, permitting a slight retraction of the folder from the extreme swing which is at first executed in folding down the flap. This permits easy action of the sealing apparatus which is next to be described, and which consists of a padded extension of the folder $F^1$ arranged along its free edge as shown in the drawings in position 10 of Fig. 1 where it is marked X. It is also seen in Figs. 21 and 22, and associated parts that operate it are clearly shown in Fig. 23. This folder extension is a bar X seen in detail in Fig. 21 mounted on guide pins $X^6$ which project into the folder plate $F^1$ edgewise thereof and permits motion between the full line and dotted line positions of Fig. 21. Springs $X^7$ tend to hold this extension piece retracted; and a bell crank lever $X^8$ turning on pivot $X^9$ on the folder $F^1$ and bearing against a block $X^{10}$ on the extension is in position to push the extension out to its dotted line position. The bell crank lever is actuated by a rock shaft $X^2$, journaled in the carriage C and having a projecting finger $X^4$ adapted to engage the tail of the bell crank lever as seen in Fig. 21 when the holder $F^1$ is in its turned down position. The rock shaft $X^2$ stands upright near the leading edge of the carriage and carries at its top the arm $X^4$ in the form of a vane or wing as seen in Fig. 23; is suitably journaled in the plate C; and below that plate has two arms one of which $X^{11}$ is attached by a spring $X^{12}$ to the under side of the carriage and the other of which $X^1$ projects in position to engage a stationary cam $X^3$ on the under side of cam plate M, Figs. 25, 26. As the carriage moves forward, contact with this cam swings the arm $X^1$ backward, turning the rock shaft $X^2$ and forcing its upper arm $X^4$ against the tail of the bell crank lever, and so projecting the extension X edgewise from the edge of the folder $F^1$. Inasmuch as the folder at this moment is not pressed firmly down upon the top of the chocolate bar, but is slightly retracted as has just been described, this movement is executed without requiring much power and it extends far enough to carry the extension X to the extreme edge of the pasted flap of the label, which in the apparatus illustrated, lies close to the rear edge of the top of the chocolate bar.

The under side of the extension is provided with a resilient surface $X^{13}$ which may conveniently be made of soft rubber and which is even with the adjacent resilient surface $F^{13}$ of the folder $F^1$. On the under side of the cam plate M, located so as to act as the carriage approaches the carriage position 10 of Fig. 1, is a projecting cam plate $F^{12}$, in line with cams $F^4$ and $F^8$ and adapted to engage the pin $F^{11}$ that operates the folder $F^1$, the action of which is to press that folder down upon the chocolate bar. The position at this time is inverted, and the pressure is upward on the bar against the inverted cradle, but that makes no difference in the action because the parts are held firmly by the latch as the inversion occurs and later by this cam as the parts travel along underneath. The projected extension X is pressed firmly upon the chocolate bar with the folder $F^1$ and in its projected position comes against the pasted edge of the label flap, thus sealing it and holding it while the paste sets. It will be observed in Fig. 1, that a considerable distance, relatively, exists between the place where the paste is applied to the label at position 7, and that where the final pressing of the pasted edge into position occurs, just prior to position 10. This allows whatever time is necessary for the paste to be tempered. This long distance is provided without extending the length of the machine, by utilizing the curve around one of the sprocket wheels and a portion of the under side of the machine. It will also be noticed that the cam $F^{12}$ is relatively long and that it could easily be designed longer than it is shown, within the limits of the machine, thus providing a sufficiently long time for the extension to hold the pasted edge pressed in its sealed position without lengthening or enlarging the machine. At the termination of the cam $F^{12}$ the folder $F^1$ is free to return to its upright position except as it is held by the latch W; and that latch is released by the cam $W^4$ which follows immediately, with the result that the folder $F^1$ assumes the position shown in position 11 of Fig. 1, thus allowing the chocolate bar to drop from the machine completely incased in tinfoil and with an outside wrapper sealed around it.

The carriage is now ready to begin upon another circuit except that the sub-carriage which was used for conveying the leading edge of the label from the rear to the front of the carriage at position 6 must be returned to its initial position. That return is accomplished by cams $R^{17}$ depending from the under side of the cam plate M and projecting laterally therefrom in position to engage pins $R^{18}$ (Fig. 3) which project vertically from the hubs on the rotating stud $R^{19}$, which is set in and fast to the levers $R^7$ which move the sub-carriage. These pins project on the opposite side from those parts of the levers $B^7$ which are engaged in order to throw the sub-carriage forward. Consequently as the carriage moves forward and the pins $R^{18}$ encounter the stationary cam they, being swung backward, swing the tops of levers $R^7$ backward and thus slide the sub-carriages $R^{11}$, $R^{12}$, backward to its initial position.

The carriage then proceeds on with the chain A and goes through another circuit performing its functions upon another chocolate bar.

I claim as my invention:—

1. In a wrapping machine, the combination of a series of carriages movable through a circuit, stationary holders for article and wrapper, means on each carriage to seize an article and wrapper therefrom while moving past, and to wrap them together while continuing together through the circuit.

2. In a wrapping machine the combination of a series of carriages movable through a circuit; stationary holders for article and wrapper; means on each carriage to seize an article and wrapper therefrom while moving past, appliances on each carriage to wrap these together and stationary means alongside said circuit, adapted to engage and actuate said wrapping appliances as the carriages pass them.

3. A wrapping machine including, in combination, two parallel endless conveyer chains; carriages secured transversely across both; receiving and wrapping appliances thereon, having projecting parts; and stationary elements adapted to engage and actuate the wrapping appliances, said appliances and elements being arranged in pairs acting simultaneously in opposite directions laterally, whereby they tend automatically to maintain the alinement of the conveyer chains.

4. A wrapping machine, including the combination of an endless conveyer; a multiplicity of successive groups of wrapping mechanisms thereon, each group being adapted to seize an article from a position of rest by acting against it transversely of the direction of travel as it passes such position, and to wrap such article, by successively acting elements in said group, as the article and group move on together; and stationary means arranged in succession for actuating elements as they are conveyed past such actuating means.

5. A wrapping machine, including, in combination, a series of carriages and means to move them through a circuit; wrapping mechanism on each; a holder for a stack of articles arranged in substantially vertical column above the circuit; and gripping mechanism moving with the wrapping mechanism and adapted to rise above the wrapping mechanism, seize an article so held, and guide it into position for wrapping.

6. A wrapping machine, including, in combination, a series of carriages and means to move them through a circuit; wrapping mechanism on each; a holder for a supply of articles over the circuit adapted to expose those surfaces of the lowest article that face laterally of the direction of travel; and grippers moving with the wrapping mechanism and adapted to stand at both sides, laterally, and to move inward from the sides of the wrapping mechanism, seize an article so held, and guide it into position for wrapping.

7. A wrapping machine including, in combination, a series of carriages and means to move them through a circuit; wrapping mechanism on each; a holder for a supply of articles above the circuit, and grippers moving with the wrapping mechanism adapted to rise above the wrapping mechanism and to project inward from opposite sides, to seize an article so held and to guide it downward centrally into position for wrapping, said grippers being adapted and so mounted as to fold the projecting ends of the wrapper down upon the article.

8. In a wrapping machine the combination of a series of carriages and means for moving them successively through a definite circuit; wrapping appliances thereon; means to hold articles in a stationary position above passing wrapping appliances; jaws on each carriage normally arranged, when not operating, in a lateral direction from the middle line of the circuit traveled by the carriage on which are the wrapping appliances, and means to move them upward to seize an article in said position, and downward, carrying it into position for the wrapping operation.

9. In a wrapping machine the combination of a series of carriages and means for moving them successively through a definite circuit; wrapping appliances thereon; means to separate a single article from a supply and hold it stationary in a predetermined position above passing wrapping appliances; means to restrain the succeeding articles in the supply from contact with said single article; jaws on each carriage, and means to move them upward to seize an article in said position, and downward carrying it into position for the wrapping operation.

10. A wrapping machine, including, in combination, a series of carriages and means to move them through a circuit; wrapping mechanism on each; means to support an article above the circuit with its lateral edges exposed; grippers moving with the wrapping mechanism; means actuating said grippers to seize the article by said edges, and means simultaneously acting to release said support of the article.

11. A wrapping machine, including, in combination, a series of carriages and means to move them through a circuit, wrapping mechanism on each; a ledge arranged in stationary position above the circuit, movably supported and adapted to support the middle portion of an article, leaving its lateral edges exposed; and means moving with the wrapping mechanism to seize by its lateral edges an article so supported and to carry it from its said supported position, the said ledge simultaneously moving out of the way.

12. A wrapping machine, including, in combination, a series of carriages and means to move them through a circuit, wrapping mechanism on each, a ledge pivotally supported above the circuit and adapted to support the middle portion of an article, said pivot being on a horizontal axis transverse to the direction of movement of the carriage, said ledge being movable downward about said pivot to permit forward and downward movement of the article from its said supported position; and means moving with the wrapping mechanism to seize the article while supported on the ledge and to move it downward and forward simultaneously with the said movement of the ledge.

13. A wrapping machine, including, in combination, a series of carriages and means to move them through a circuit, wrapping mechanism on each, a ledge pivotally supported above the circuit and adapted to support the advanced edge of an article, a pivotal support on an axis transverse to the line of motion of the carriage, whereon said ledge may swing downward and forward; another ledge, stationary and adapted to support the rear edge of an article whose forward edge is supported by the first mentioned ledge, and means moving with the wrapping mechanism to seize an article supported on both and carry it forward and downward simultaneously with the forward and downward movement of said first mentioned ledge.

14. A wrapping machine, including, in combination, a series of carriages and means to move them through a circuit, wrapping mechanism on each, a ledge pivotally supported above the circuit and adapted to support an article above the circuit, said pivotal support having its axis transverse to the direction of travel of the carriage; a latch normally holding it in position, there being means whereby it tends to swing downward when the latch is released; and the latch being arranged to be engaged by a part on the moving carriage; and means moving with the wrapping mechanism to seize an article resting on said support and simultaneously to release said latch.

15. A wrapping machine, including, in combination, a series of carriages and means to move them through a circuit, wrapping mechanism on each, a support for an article above the circuit and means whereby said support tends to be withdrawn; a latch holding it in position; grippers mounted on the carriage having vertical movement with respect to the wrapping mechanism thereon and adapted, when elevated, to seize an article supported on the said ledge and carry it downward to the wrapping mechanism as they pass; a part elevated with said grippers being adapted to engage and release said latch, the immediate downward movement of the grippers carrying it free of other parts.

16. A wrapping machine, including, in combination, a series of carriages and means to move them through a circuit, wrapping mechanism on each, a removable support for an article above the circuit and means on each carriage to seize the article as the carriage passes and simultaneously remove said support.

17. A wrapping machine, including, in combination, a series of carriages and means to move them through a circuit; wrapping mechanism on each, including a cradle, conforming superficially to the form of the article that is to be wrapped, other parts of said mechanism normally standing up around and above said cradle; grippers adapted to move vertically with respect to said cradle; and means whereby said grippers may seize an article above said cradle, their said vertical motion then settling it into the cradle, and may tuck downward and inward upon the article when resting in the cradle the projecting ends of a sheet that has been wrapped about it.

18. A wrapping machine, including, in combination, a series of carriages and means to move them through a circuit; wrapping mechanism on each, including a cradle, conforming superficially to the form of the article that is to be wrapped; means before and behind the cradle acting at an elevation above it, to stretch a sheet of tinfoil or other wrapping material and to spread it above the cradle; grippers adapted to move vertically with respect to said cradle; means to support an article above said circuit; and means whereby said grippers may seize said article when above said cradle, their said vertical motion then settling it and the wrapping material into said cradle.

19. A wrapping machine, including, in combination, a series of carriages and means to move them through a circuit; wrapping mechanism on each, including a cradle, conforming superficially to the form of the article that is to be wrapped; means before and behind the cradle at an elevation above it, for supporting a sheet of tinfoil or other wrapping material and spreading it above the cradle; a stationary tension drag adapted to engage the rear part of said wrapping material as it passes, by friction between itself and said rear support; and means to seize an article above the circuit and move it downward with the wrapping material into said cradle.

20. A wrapping machine, including, in combination, a series of carriages and means to move them through a circuit; wrapping mechanism on each, including a cradle, conforming superficially to the form of the article that is to be wrapped; means for spreading the sheet of tinfoil or other wrapping material above said cradle; means for gripping an article above the circuit and moving it downward, settling it and the wrapping material into the cradle; and a friction drag adapted to bear on the top of the rear portion of the wrapping material as the article moves it downward.

21. A wrapping machine, including, in combination, a series of carriages and means to move them through a circuit; wrapping mechanism on each, including a cradle, conforming superficially to the form of the article that is to be wrapped; means for spreading the sheet of tinfoil or other wrapping material above said cradle; means for gripping an article above the circuit and moving it downward, settling it and the wrapping material into the cradle; and a friction drag adapted to bear on the top of the rear portion of the wrapping material as the article moves it downward, said drag comprising an element which is stationary against movement in the direction of carriage movement, but having an edge adjustable in said direction, whereby the position of the wrapper with respect to the article in the cradle may be varied.

22. A wrapping machine, including, in combination, a series of carriages and means to move them through a circuit, wrapping mechanism on each; means on the forward edge of each for seizing a web of tinfoil or other wrapping material above it, the motion of the carriage drawing it forth and spreading it over the carriage; and means at the rear of each carriage for severing said web.

23. A wrapping machine, including, in combination, a series of carriages and means to move them through a circuit, wrapping mechanism on each; means on the forward edge of each for seizing a web of tinfoil or other wrapping material above it, the motion of the carriage drawing it forth and spreading it over the carriage; means at the rear of each carriage for severing said web; and means controlling the action of said severing means so that it does not precede said seizure on the next succeeding carriage.

24. A wrapping machine, including, in combination, a series of carriages and means to move them through a circuit, wrapping mechanism on each; means on the forward edge of each for seizing a web of tinfoil or other wrapping material above it, said wrapping material being held in continuous web form and drawn forth continuously at speed uniform with the said movement of carriages; and severing means acting upon said web after it has been seized and in advance of the last point of seizure.

25. A wrapping machine, including, in combination, a series of carriages and means to move them through a circuit, wrapping mechanism on each; and means on the forward edge of each for seizing a web of tinfoil or other wrapping material above it, comprising fingers adapted to move inward and downward to clamp the edges of the web.

26. A wrapping machine, including, in combination, a series of carriages and means to move them through a circuit, including a guide wheel turning on a horizontal axis, up and over past which the carriages move; means to hold a supply of tinfoil or other wrapping material in web form adjacent to said guide wheel, the web extending over the wheel, the carriages rising as aforesaid under said web and moving in the direction in which it extends; and means for clamping said web to the said carriages, comprising jaws, adapted to clamp the edges of the web; and mechanism operating the upper jaw, moving it outward, upward, inward and downward upon the wrapping material resting on the lower jaw.

27. A wrapping machine, including, in combination, a series of carriages and means to move them through a circuit, including a guide wheel turning on a horizontal axis, up and over past which the carriages move; means to hold a supply of tinfoil or other wrapping material in web form adjacent to said guide wheel, the web extending over the wheel, the carriages rising as aforesaid under said web and moving in the direction in which it extends; and means for clamping said web to the said carriages, comprising jaws, adapted to clamp the edges of the web; and means to move the upper jaw laterally outward with respect to the web to allow the under jaw to rise around said wheel into contact with the under side of the web, and then to move it laterally inward and downward upon the upper side of said web.

28. A wrapping machine, including, in combination, a series of carriages and means to move them through a circuit, including a guide wheel turning on a horizontal axis, up and over past which the carriages move; means to hold a supply of tinfoil or other wrapping material in web form adjacent to said guide wheel, the web extending over the wheel, the carriages rising as aforesaid under said web and moving in the direction in which it extends; and means for clamping said web to the said carriages, comprising jaws, adapted to clamp the edges of the web, the under jaw being fixed on the carriage and the upper jaw having a spring normally drawing it down and inward toward the under jaw; there being a lever having a pin and slot fulcrum on which said upper jaw is mounted, and cams stationary in the machine for moving the other end of said lever to actuate the jaw.

29. A wrapping machine, including, in combination, a series of carriages and means to move them through a circuit, including a guide wheel turning on a horizontal axis, up and over past which the carriages move; means to hold a supply of tinfoil or other wrapping material in web form adjacent to said guide wheel, the web extending over the wheel, the carriages rising as aforesaid under said web and moving in the direction in which it extends; and means for clamping said web to the said carriages, comprising jaws, adapted to clamp the edges of the web, the under jaw being fixed on the carriage and the upper jaw having a spring normally drawing it down and inward toward the under jaw; there being a lever having a pin and slot fulcrum on which said upper jaw is mounted, and cams stationary in the machine and having surfaces pushing the other end of said lever inward and upward and releasing it to permit the spring to throw the jaw end back inward and downward.

30. A wrapping machine, including in combination a series of carriages and means to move them through a circuit, wrapping mechanism on each; means to spread a strip of wrapping material over said carriages and means to sever from said strip suitable lengths of wrapping material for each, comprising blades moving with said wrapping mechanism.

31. A wrapping machine, including in combination a series of carriages and means to move them through a circuit, wrapping mechanism on each; means to spread a strip of wrapping material over said carriages and means to sever from said strip suitable lengths of wrapping material for each, comprising a blade on each carriage underlying the strip and coöperating blades adapted to swing in from the sides.

32. A wrapping machine, including in combination a series of carriages and means to move them through a circuit, wrapping mechanism on each; means to spread a strip of wrapping material over said carriages and means to sever from said strip suitable lengths of wrapping material for each, comprising a blade on each carriage underlying the strip and coöperating blades adapted to swing in from the sides, these two blades together cutting along the entire length of the under blade.

33. A wrapping machine, including in combination a series of carriages and means to move them through a circuit, wrapping mechanism on each; means to spread a strip of wrapping material over said carriages and means to sever from said strip suitable lengths of wrapping material for each, comprising a blade on each carriage underlying the strip and coöperating blades adapted to swing in from the sides, one of the blades having an end retreating from the tip of its edge and the other having an end projecting beyond the tip of its edge and comprising a cutting edge, whereby it cuts all of the width of wrapping material left uncut by the first blade.

34. A wrapping machine, including in combination a series of carriages and means to move them through a circuit, wrapping mechanism on each; means to spread a strip of wrapping material over said carriages and means to sever from said strip suitable lengths of wrapping material for each, comprising a blade on each carriage underlying the strip and coöperating blades adapted to swing in from the sides, one of the blades having an end retreating from the tip of its edge and the other having an end projecting beyond the tip of its edge and comprising a cutting edge, whereby it cuts all of the width of wrapping material left uncut by the first blade; said blades traveling with said carriages and means whereby the blade with the projecting end is closed after and opened before the other.

35. A wrapping machine, including in combination a series of carriages and means to move them through a circuit, wrapping mechanism on each; means to spread a strip of wrapping material over said carriages and means to sever from said strip suitable lengths of wrapping material for each, comprising a blade on each carriage underlying the strip and coöperating blades adapted to swing in from the sides, and loose pivotal connections between the inward swinging blades and the first mentioned blade, a spring tending to hold the blades together; and a cam contacting with said pivoted blades and tipping them to a slight angle with the fixed blade, whereby the cutting surfaces wear sharp.

36. A wrapping machine, including in combination a series of carriages and means to move them through a circuit, wrapping mechanism on each; means to spread a strip of wrapping material over said carriages and means to sever from said strip suitable lengths of wrapping material for each, comprising blades coöperating with a shearing cut and means to tip one of the blades transversely to a slight angle with the other as it cuts, whereby the cutting edges wear sharp.

37. A wrapping machine, including in combination a series of carriages and means to move them through a circuit, including a guide wheel turning on a horizontal axis, upward and over past which the carriages move; means to hold a supply strip of wrapping material in web form adjacent to said guide wheel, the web extending over the wheel, the carriages rising as aforesaid under said web and moving in the direction in which it extends; wrapping mechanism on the carriages; blades mounted at the sides of the carriages and adapted to swing between positions of perpendicularity and parallelism to the carriages; and operating means, whereby each said blade when traveling upward around said guide wheel stands in perpendicularity, thereby allowing the web to be positioned on the carriage, and then swings down upon the web, severing it.

38. A wrapping machine, including in combination a series of carriages and means to move them through a circuit, wrapping mechanism on each, means on the forward edge of each for seizing a web of wrapping material, a blade on the rear of each adapted to sever the web, said blade being pivotally mounted; and stationary means adapted to be engaged by a part on the carriage as it moves forward, and connecting mechanism, whereby the movement of said part changes the position of the blade on the carriage.

39. A wrapping machine, including in combination a series of carriages and means to move them through a circuit, wrapping mechanism on each, means on the forward edge of each for seizing a web of wrapping material, a blade on the rear of each adapted to sever the web, said blade being pivotally mounted; and stationary means adapted to be engaged by a part on the carriage as it moves forward and connecting mechanism whereby the movement of said part changes the position of the blade on the carriage, including a lever with pin and slot connection.

40. A wrapping machine, including in combination a series of carriages and means to move them through a circuit, wrapping mechanism on each, means on the forward edge of each for seizing a web of wrapping material, a blade on the rear of each adapted to sever the web, said blade being pivotally mounted; stationary means adapted to be engaged by a part on the carriage as it moves forward, and connecting mechanism whereby the movement of said part changes the position of the blade on the carriage, comprising a pair of coöperating levers compounding a slight movement of said part into approximately a 90° movement of said blade.

41. A wrapping machine, including in combination a series of carriages and means to move them through a circuit, wrapping mechanism on each, means on the forward edge of each for seizing a web of wrapping material, a blade on the rear of each adapted to sever the web, said blade being pivotally mounted; stationary means adapted to be engaged by a part on the carriage as it moves forward, and connecting mechanism whereby the movement of said part changes the position on the carriage, comprising a pair of coöperating levers compounding a slight movement of said part into approximately a 90° movement of said blade, said part being a pivoted block, working in a plane parallel to the bed of the carriage, one of the connecting levers being likewise parallel; and the other lever and the blade working in a plane perpendicular thereto.

42. A wrapping machine including in combination a series of carriages and means to move them through a circuit, wrapping mechanism on each, and mechanism on each for gripping the article that is to be wrapped, including a jaw adapted to engage the article; means for guiding the jaw from and toward the wrapping mechanism, such means including a projecting part movable to and fro in the direction of travel of the carriage; and an element adjacent to the circuit adapted to engage and move said projecting part as the carriage passes.

43. A wrapping machine including in combination a series of carriages and means to move them through a circuit; wrapping mechanism on each, including jaws, coöperating to seize between them an article that is to be wrapped, means for guiding the jaws from and toward the wrapping mechanism, such means including a part projecting from the carriage and movable to and fro in the direction of travel of the carriage and an element adjacent to the circuit adapted to engage and move said projecting part as the carriage passes.

44. A wrapping machine including in combination a series of carriages and means to move them through a circuit; wrapping mechanism on each; grippers for the articles that are to be wrapped, comprising jaws and means guiding the jaws with a sliding motion in a direction substantially perpendicular to the direction of movement of the carriage, and connections actuating the jaws, said connections swinging up and down longitudinally in the direction of travel of the carriage.

45. A wrapping machine including in combination a series of carriages and means to move them through a circuit; wrapping mechanism on each; grippers for the articles that are to be wrapped, comprising jaws and means guiding the jaws with a sliding motion in a direction substantially perpendicular to the direction of movement of the carriage; connections having approximately negligible inertia whereby the progress of the carriage actuates the jaws thereon and multiplies the speed of sliding of the jaws in their direction of movement with respect to the speed of movement of carriage in its direction of movement.

46. A wrapping machine including in combination a series of carriages and means to move them through a circuit; wrapping mechanism on each; grippers for the articles that are to be wrapped, comprising jaws and means guiding the jaws with a sliding motion in a direction substantially perpendicular to the direction of movement of the carriage; a pivoted lever having a projecting short arm and long arm with pin and slot connection to the sliding part; and an element on the stationary portion of the machine adapted to engage the projecting arm as it passes and thereby to project the said sliding part faster in its direction of movement than the carriage is traveling in its direction of movement.

47. A wrapping machine including in combination a series of carriages and means to move them through a circuit; wrapping mechanism on each; grippers for the articles that are to be wrapped, comprising jaws and means guiding the jaws with a sliding motion in a direction substantially perpendicular to the direction of movement of the carriage; a head on said sliding part adapted to move thereon parallel to the plane of the carriage on which it is mounted; and means to control the perpendicular sliding and the parallel sliding independently of each other.

48. A wrapping machine including in combination a series of carriages and means to move them through a circuit; wrapping mechanism on each; grippers for the articles that are to be wrapped, comprising jaws and means guiding the jaws with a sliding motion in a direction substantially perpendicular to the direction of movement of the carriage; a head adapted to slide on said sliding part parallel to the plane of the carriage on which it is mounted, toward and from the place where the article is located; a spring holding it normally retracted; and means controlled by the position of the carriage in the circuit for moving and holding it toward said article's location to hold the article.

49. A wrapping machine including in combination a series of carriages and means to move them through a circuit; wrapping mechanism on each; grippers for the articles that are to be wrapped, comprising jaws and means guiding the jaws with a sliding motion in a direction substantially perpendicular to the direction of movement of the carriage; a head on said sliding part adapted to move thereon parallel to the plane of the carriage on which it is mounted; a spring holding it normally retracted; and a lever on the carriage having a surface extending substantially parallel to the said perpendicular guide, which surface is adapted to bear on the said head, opposing the spring; and means controlling the position of said lever and bearing surface according to the position of the carriage in the circuit, thereby controlling the position of the head in a direction parallel to the plane of the carriage and at various distances from said plane.

50. A wrapping machine including in combination a series of carriages and means to move them through a circuit; wrapping mechanism on each; grippers for the articles that are to be wrapped, comprising jaws and means guiding the jaws in two directions substantially perpendicular to each other and to the direction of movement of the carriage on which they are mounted, and actuating connections.

51. A wrapping machine including in combination a series of carriages and means to move them through a circuit; wrapping mechanism on each; grippers for the articles that are to be wrapped, comprising jaws and means guiding the jaws in two directions substantially perpendicular to each other and to the direction of movement of the carriage on which they are mounted; and cams on the stationary part of the machine controlling the position of the parts in their said perpendicular paths, according to the position of the carriage on which they are mounted as it moves through the circuit.

52. A wrapping machine, including in combination a series of carriages and means to move them through a circuit, wrapping mechanism on each; gripping heads having jaws adapted to coöperate with each other to seize an article that is to be wrapped; means maintaining said jaws parallel to the plane of the carriage on which they are mounted; a holder for a supply of articles that are to be wrapped, and means for positioning the leading article therein approximately parallel to the said carriage; a cradle on the said carriage approximately parallel to the same plane; and means to move said jaws to seize the article between them and convey it to said cradle, the jaws having V-shaped throats whereby the article seized is alined into parallelism as it becomes seated in the jaws.

53. A wrapping machine including in combination a series of carriages and means to move them through a circuit, wrapping mechanism on each; a pair of grippers on each, comprising jaws and means for moving them simultaneously toward the article that is to be wrapped to grip it between them, the gripping parts of said jaws being supported in automatically adjustable relation by relatively weak springs.

54. A wrapping machine including in combination a series of carriages and means to move them through a circuit, wrapping mechanism on each; a pair of grippers on each, comprising jaws and means for moving them simultaneously toward the article that is to be wrapped to grip it between them, the gripping faces of said jaws being of skeleton formation, with recesses into which abnormal projecting parts of the article that is to be wrapped may enter without affecting the alinement and position of the main body of the article.

55. A wrapping machine, including in combination a series of carriages and means to move them through a circuit; wrapping mechanism on each; and a pair of grippers on each adapted to coöperate to hold between themselves an article that is to be wrapped; there being means for supplying the articles to a predetermined position, and the said grippers having jaw faces shaped to fit against and in substantial parallelism with the upper and under corner faces of the opposite ends of the article that is to be wrapped.

56. A wrapping machine for articles having inclined end faces, including in combination a series of carriages and means to move them through a circuit; wrapping mechanism on each; means to supply the articles with their said inclined faces underneath; and a pair of grippers on each carriage coöperating to press oppositely against the said articles, to seize and hold them; the said gripper faces being inclined to correspond to said article faces and having upper terminal lips.

57. A wrapping machine for articles having inclined end faces, including in combination a series of carriages and means to move them through a circuit; wrapping mechanism on each; means to supply the articles with their said inclined faces underneath; and a pair of grippers on each carriage coöperating to press oppositely against the said articles, to seize and hold them; the said gripper faces being inclined to correspond to said article faces and having upper terminal lips projecting at an incline, whereby they level the article as they approach it.

58. A wrapping machine, including in combination a series of carriages and means to move them through a circuit; wrapping mechanism on each; grippers, arranged in coöperating pairs movable from the carriage to reach toward each other to grip the article that is to be wrapped; and actuating mechanism therefor, including a continuous cam holding the grippers together during their return to the carriage and during the initial action of said wrapping mechanism.

59. A wrapping machine including in combination a series of carriages and means to move them through a circuit; wrapping mechanism on each; grippers adapted to seize an article that is to be wrapped and to deposit and hold it firmly within the wrapping mechanism; means for depositing a sheet of wrapping material in the wrapping mechanism under the article so held; and means to withdraw the said grippers laterally to positions outside of said wrapper.

60. A wrapping machine, including in combination a series of carriages and means to move them through a circuit; wrapping mechanism on each; grippers adapted to seize an article that is to be wrapped and to move it into position for said wrapping mechanism; means to spread a sheet of wrapping material between the place of said article's seizure and of its deposit; and friction-producing means, acting on the grippers to regulate their movement while holding the article and acting as a drag on tinfoil during such movement of said article.

61. A wrapping machine, including in combination a series of carriages and means to move them through a circuit; wrapping mechanism on each; a pair of grippers movable toward each other to seize an article above the carriage and movable downward toward the carriage to deposit it thereon; springs tending to separate the grippers; and means pressing the grippers toward each other in opposition to said springs and having frictional bearing, whereby the effect of gravity is regulated during the descent.

62. A wrapping machine, including in combination a series of carriages and means to move them through a circuit; a cradle on each, comprising a plate having an upper surface conforming to the under surface of the article that is to be wrapped, wrapping devices arranged on four sides of said cradle; means to hold the article that is to be wrapped stationary in a position over said circuit; and means to move it thence downward centrally into said cradle.

63. A wrapping machine, including in combination a series of carriages and means to move them through a circuit; and wrapping mechanism on each, including a cradle for holding the bottom and sides of the article, grippers adapted to hold the article stationary therein by its ends, and folders at front and rear of the cradle for wrapping material from the sides over upon the article while it is so held by its ends; said grippers being adapted also to tuck in the ends of projecting material thus wrapped.

64. A wrapping machine, including in combination a series of carriages and means to move them through a circuit; and wrapping mechanism on each, including a cradle for holding the bottom and sides of the article, grippers adapted to hold the article stationary therein by its ends; folders at front and rear of the cradle for wrapping material from the sides over upon the article while it is so held by its ends, and means for withdrawing the end grippers laterally through the tube of wrapping material thus formed and returning them to the article in direction to collapse said tube upon the article.

65. A wrapping machine, including in combination a series of carriages and means to move them through a circuit; and wrapping mechanism on each, including a cradle for holding the article and its wrapper, front and rear folders over the sides of the article, and means to tuck in the ends of the material thus wrapped comprising heads movable laterally inward and downward to the ends of the article.

66. A wrapping machine, including in combination a series of carriages and means to move them through a circuit; and wrapping mechanism on each, including a cradle for holding the article and its wrapper, front and rear folders over the sides of the article, and means to tuck in the ends of the material thus wrapped comprising heads movable laterally inward and downward to the ends of the article, the said heads having faces presented toward the article parallel to the end faces of the article.

67. A wrapping machine for articles having end faces inclined downward and inward, including in combination a series of carriages and means to move them through a circuit; and wrapping mechanism on each, including a cradle for holding the article and its wrapper, front and rear folders over the sides of the article, and means to tuck in the ends of the material thus wrapped comprising heads movable laterally inward and downward to the ends of the article; the said heads having faces conforming in angular inclination to the end faces of the article and the said movement of heads being substantially parallel to and in the same plane with the said ends of the article.

68. A wrapping machine for articles having end faces inclined downward and inward, including in combination a series of carriages and means to move them through a circuit; wrapping mechanism on each, including a cradle for holding the article and its wrapper, front and rear folders over the sides of the article, and means to tuck in the ends of the material thus wrapped comprising heads movable laterally inward and downward to the ends of the article; means to withdraw said heads; and end folders, adapted to move the under part of the projecting wrapper upward against said end faces.

69. A wrapping machine for articles having end faces inclined downward and inward, including in combination a series of carriages and means to move them through a circuit; wrapping mechanism on each, including a cradle for holding the article and its wrapper, front and rear folders over the sides of the article, and means to tuck in the ends of the material thus wrapped comprising heads movable laterally inward and downward to the ends of the article; means to withdraw said heads; and end folders, adapted to move the under part of the projecting wrapper upward against said end faces and over and down upon the top of the article.

70. A wrapping machine for articles having end faces inclined downward and inward, including in combination a series of carriages and means to move them through a circuit; wrapping mechanism on each, including a cradle for holding the article and its wrapper, front and rear folders over the sides of the article, and means to tuck in the ends of the material thus wrapped comprising heads movable laterally inward and downward to the ends of the article; means to withdraw said heads; and end folders, adapted to move the under part of the projecting wrapper upward against said end faces, said end folders each comprising a spring-supported advance flap to fold the bottom up against the end and a surface adapted to swing around the end and downward upon the top.

71. A wrapping machine for articles having end faces inclined downward and inward, including in combination a series of carriages and means to move them through a circuit; wrapping mechanism on each, including a cradle for holding the article in its wrapper, front and rear folders over the sides of the article, and means to tuck in the ends of the material thus wrapped comprising heads movable laterally inward and downward to the ends of the article; means to withdraw said heads; and end folders, adapted to move the under part of the projecting wrapper upward against said end faces, said end folders each comprising a swinging element having a face with reëntrant angle conforming to and adapted to swing into position bearing against the upper outer angle of said article at its end.

72. A wrapping machine for articles having end faces inclined downward and inward, including in combination a series of carriages and means to move them through a circuit; wrapping mechanism on each, including a cradle for holding the article and its wrapper, front and rear folders over the sides of the article, and means to tuck in the ends of the material thus wrapped comprising heads movable laterally inward and downward to the ends of the article; means to withdraw said heads; end folders, adapted to move the under part of the projecting wrapper upward against said end faces, said end folders being pivoted below and when not in operation located below said cradle; and jaws adapted to move toward and from said article to engage the ends thereof over said end folders.

73. A wrapping machine for articles having end faces inclined downward and inward, including in combination a series of carriages and means to move them through a circuit; wrapping mechanism on each, including a cradle for holding the article and its wrapper, front and rear folders over the sides of the article, and means to tuck in the ends of the material thus wrapped comprising heads movable laterally inward and downward to the ends of the article; means to withdraw said heads; and end folders, adapted to move the under part of the projecting wrapper upward against said end faces, said end folders when in final folding position being located above and below the positions of the ends of said article in said cradle, and when in inactive position having a surface projecting downward and outward; a lever N adapted to swing upward, bearing against said surface and pushing it to an upward and outward angle, thereby actuating said end folder to move it to said final folding position.

74. A wrapping machine, including in combination a series of carriages and means to move them through a circuit; means to assemble an article and a sheet of wrapping material on each; and wrapping mechanism, comprising a cradle adapted to fit the bottom of the article, folders for wrapping the material forward and backward over the article, and end molds mounted on the carriage movably and adapted to fit the ends of the article, thereby pressing the wrapper into position on all sides of the article.

75. A wrapping machine, including in combination a series of carriages and means to move them through a circuit; means to assemble an article and a sheet of wrapping material on each; and wrapping mechanism, comprising a cradle adapted to fit the bottom of the article, folders for wrapping the material forward and backward over the article, and end molds mounted on the carriage movably and adapted to fit the ends of the article, thereby pressing the wrapper into position on all sides of the article; there being two of said molds at each end, acting successively, one acting downward and inward upon the article and the other acting upward and inward upon the article.

76. A wrapping machine, including in combination a series of carriages and means to move them through a circuit; wrapping mechanism on each, including a cradle for holding the article that is to be wrapped and folders arranged on pivots extending on opposite sides of the article so held; and means for actuating said folders, comprising levers each pivoted at one end on the carriage, a link connecting the free end of each lever to one of said pivoted folders, and a stationary part in the said circuit adapted to engage the levers when moving with the carriage, and thereby to swing them to actuate the folders.

77. A wrapping machine, including in combination a series of carriages and means to move them through a circuit; wrapping mechanism on each, including a pair of folders arranged on opposite sides of the position of the article when being wrapped and adapted to swing successively over upon the article; auxiliary tongues associated with the folder which operates first, adapted to remain after said folder has swung back and while the second is swinging down.

78. A wrapping machine, including in combination a series of carriages and means to move them through a circuit; wrapping mechanism on each, including a pair of folders arranged on opposite sides of the position of the article when being wrapped and adapted to swing successively over upon the article; auxiliary tongues associated with the folder which operates first, adapted to remain after said folder has swung back and while the second is swinging down; said tongues being mounted slidably parallel to the folded position of the folder, and means whereby they may be projected between said folder and the wrapper which it has folded and withdrawn after action of the second folder.

79. A wrapping machine, including in combination a series of carriages and means to move them through a circuit; wrapping mechanism on each, including a pair of folders arranged on opposite sides of the position of the article when being wrapped and adapted to swing successively over upon the article; auxiliary tongues associated with the folder which operates first, adapted to remain after said folder has swung back and while the second is swinging down; said tongues being mounted slidably parallel to the folded position of the folder, and means whereby they may be projected between said folder and the wrapper which it has folded and withdrawn after action of the second folder, the said folders having yielding surfaces and the said tongues being mounted loosely, whereby on being projected they may rise over protuberances.

80. A wrapping machine, including in combination a series of carriages, means to move them through a circuit having parallel rectilinear courses joined by semi-circular ends; wrapping mechanism on each, including a folder pivoted beside the position of the article that is to be wrapped; means turning the folder down upon the article as a curved part of the course is approached; and a latch adapted to engage and hold said folder down while going around the curve.

81. A wrapping machine, including in combination a series of carriages and means to move them through a circuit; wrapping mechanism on each, including a folder pivoted beside the position of the article that is to be wrapped; there being a movable edge portion of the folder and means for projecting it radially from the pivot of the folder, whereby the folder may swing over upon a relatively wide portion of the article for fastening the wrapper thereon.

82. A wrapping machine, including in combination a series of carriages and means to move them through a circuit; wrapping mechanism on each, including a folder pivoted beside the position of the article that is to be wrapped; there being a movable edge portion of the folder and means for projecting it radially from the pivot of the folder, whereby the folder may swing over upon a relatively wide portion of the article for fastening the wrapper thereon; and mechanism adapted successively to swing the folder and to project the said edge while the folder is in contact with the wrapper, thereby pressing the back of the wrapper on the article toward the edge of the wrapper.

83. A wrapping machine, including in combination a series of carriages and means to move them through a circuit; article gripping and wrapping mechanism on each; and means to place articles successively in position to be seized by successive carriages, comprising a vertically oscillating holder for a stack of said articles and means to separate the bottom article therefrom at each oscillation.

84. A wrapping machine, including in combination a series of carriages and means to move them through a circuit; article gripping and wrapping mechanism on each; and means to place articles successively in position to be seized by successive carriages, comprising a vertically oscillating holder for a stack of said articles, and means supporting the stack by the bottom article on downward oscillations and by the next to the bottom article on upward oscillations, thereby leaving the bottom article separate from the others of the stack.

85. A wrapping machine adapted for articles of unsymmetrical shape, including in combination a series of carriages and means to move them through a circuit; article gripping and wrapping mechanism on each; a vertically oscillating holder for a stack of said articles, and means for separating the bottom article from others of the stack at each downward movement; said holder being adapted to standardize the position of the next to the bottom article on each upward movement.

86. A wrapping machine, including in combination a series of carriages and means to move them through a circuit; article gripping and wrapping mechanism on each; a vertically oscillating holder for a supply stack of articles, the means for holding the stack comprising fingers engaging under opposite edges of an article; lugs on which said fingers deposit the stack; and means whereby said fingers, on their upward movement, swing out and upward past the bottom article and then inward and engage and lift the stack by the next to the bottom article.

87. A wrapping machine, including in combination a series of carriages and means to move them through a circuit; article gripping and wrapping mechanism on each; a vertically oscillating holder for a supply stack of articles, comprising fingers adapted to support the stack by engaging under an article; and stationary lugs adapted to support the stack by engaging elsewhere under an article; said fingers being movable and there being vertical guides for their upper ends and means swinging their lower ends out and in, thereby to release and engage articles at the bottom of the stack.

88. A wrapping machine, including in combination a series of carriages and means to move them through a circuit; article gripping and wrapping mechanism on each; a vertically oscillating holder for a supply stack of articles, comprising fingers adapted to support the stack by engaging under an article; stationary lugs adapted to support the stack by engaging elsewhere under an article; and vertical guides for upper and lower portions of said fingers, the guides for the lower portions allowing lateral movement and having an oblique auxiliary guide, whereby the downward movement is in article-engaging position and on the upward movement the fingers are spread to release the article and subsequently are brought together to engage a higher article.

89. A wrapping machine, including in combination a series of carriages and means to move them through a circuit; article gripping and wrapping mechanism on each; a vertically oscillating holder for a stack of supply articles; swinging arms adapted to control the up and down movements; and rigid connections from said arms extending in opposite directions from their pivots and adapted to be engaged by parts on the moving carriages, whereby the carriage moving in a single direction, by engagement with one arm swings the holder up and with the other swings the holder down.

90. A wrapping machine, including in combination a series of carriages and means to move them through a circuit; wrapping mechanism on each; a vertically oscillating holder for a supply stack of articles, and means adapted to actuate it when engaged by one of the carriages moving horizontally; a gripper, movable vertically on the carriage and adapted to seize an article from the holder; a part adjacent to and moving vertically with said gripper, adapted to engage and actuate said holder; there being means whereby the gripper and said part descend immediately after such actuation as the carriage progresses.

91. A wrapping machine, including in combination a series of carriages and means to move them through a circuit; wrapping mechanism on each; a ledge arranged in stationary position above the circuit, movably supported; means moving with the wrapping mechanism to seize an article supported on said ledge and means, simultaneously acting, to move said ledge away from supporting position and immediately thereafter return it to supporting position, for supporting another article.

92. A wrapping machine, including in combination a series of carriages and means to move them through a circuit; wrapping mechanism on each; a ledge arranged in stationary position above the circuit, movably supported; means moving with the wrapping mechanism to seize an article supported on said ledge; a latch adapted to hold said ledge in position, and means moving with the carriage to release said latch as the article is gripped by the passing carriage and to swing said ledge back to the latch immediately after the carriage has passed.

93. A wrapping machine, including in combination a series of carriages and means to move them through a circuit; article gripping and wrapping mechanism on each; a vertically oscillating holder for a stack of articles stationarily positioned above the circuit, comprising stationarily positioned ledges adapted to hold an article in position to be seized by the gripping mechanism, said holder having fingers adapted to engage the edges of the bottom article on a line parallel to the line of engagement by the gripping mechanism, and means whereby said fingers engage the next to the bottom article with upward movement while the stack is resting on said bottom article and ledges, thereby standardizing the position of the next to the bottom article, and subsequently move downward and deposit the standardized article on said ledges when the bottom article has been taken.

94. A wrapping machine, including in combination a series of carriages and means to move them through a circuit; wrapping mechanism on each; means to standardize the position of an article to be wrapped comprising a stationarily positioned holder for a supply of articles and means having article engaging surfaces therein oscillating vertically; and means on the carriage having article engaging surfaces movable horizontally to seize the article; the said standardizing holder being parallel to the line of engagement by said surfaces on the carriage, and the latter being >-shaped in cross section, thereby further to standardize the position of the article.

95. A wrapping machine, including in combination a series of carriages and means to move them through a circuit; means to feed primary and secondary wrappers to positions above the circuit; wrapping mechanism on each carriage, including folders adapted to swing down over the article for each wrapping; means to elevate the article after the primary wrapping action of the folders; and means to convey the second wrapper into position under it when thus elevated.

96. A wrapping machine, including in combination a series of carriages and means to move them through a circuit; article gripping and wrapping mechanism on each, said gripping mechanism comprising jaws adapted to seize opposite ends of the article, leaving free the space under the article and movable up and down; means positioning a primary wrapper and an article above it to be gripped and wrapped together; means positioning a secondary wrapper where the carriage in a later portion of the circuit passes under it; and means moving the article grippers and article upward to above its level while the carriage is passing, whereby the wrapper may be positioned on the carriage under the article.

97. A wrapping machine including in combination a series of carriages and means to move them through a circuit; wrapping mechanism on each; article grippers adapted to move the article up and down with respect to the wrapping mechanism; means placing wrappers in position to be seized, and grippers adapted to seize a wrapper so positioned, movable on each carriage parallel to the circuit thereby positioning the wrapper so seized for its wrapping mechanism.

98. A wrapping machine, including in combination a series of carriages and means to move them through a circuit; wrapping mechanism on each; article grippers adapted to move the article up and down with respect to the wrapping mechanism; means placing wrappers in position to be seized; and a sub-carriage on each carriage adapted to grip wrappers so positioned and carry them under the article when elevated, for action of the wrapping mechanism.

99. A wrapping machine, including in combination a series of carriages and means to move them through a circuit; wrapping mechanism on each; article grippers adapted to move the article up and down with respect to the wrapping mechanism; means placing wrappers in position to be seized; a frame at the rear of the carriage and movable to the front thereof, adapted to seize a wrapper and position it for action of the wrapping mechanism.

100. A wrapping machine, including in combination a series of carriages and means to move them through a circuit; wrapping mechanism on each; article grippers adapted to move the article up and down with respect to the wrapping mechanism; means placing wrappers in position to be seized; a frame at the rear of the carriage and movable to the front thereof, adapted to seize a wrapper and position it for action of the wrapping mechanism; there being ways parallel with the carriage on which said frame is adapted to slide; and a lever engaging it, pivoted on the carriage and having its short arm projecting therefrom and adapted to engage a stationary part of the machine, whereby the said frame is thrown forward rapidly as compared with the speed of the carriage.

101. A wrapping machine, including in combination a series of carriages and means to move them through a circuit; wrapping mechanism on each; means to position a wrapper above the circuit; grippers on each carriage adapted to move an article that is to be wrapped up and down with respect to the wrapping mechanism; a sub-carriage adapted to move backward and forward on the main carriage under the elevated position of the article grippers; wrapper grippers on said sub-carriage; means remaining permanently at the rear of the main carriage for actuating the said wrapper grippers; and other means on the main carriage for moving the subcarriage forward after the action of its said gripping means.

102. A wrapping machine, including in combination a series of carriages and means to move them through a circuit; wrapping mechanism on each; means to position a wrapper above the circuit; grippers adapted to seize a wrapper so positioned, comprising a frame extending across the carriage and spring jaws adapted to swing inward and downward upon it from the sides, each consisting of a loose piece, spring-pressed downward, there being a cam under the guide for lifting it; and actuators on the main carriage, one at each terminal position of said frame, for pushing said loose piece respectively inward and outward over its cam.

103. A wrapping machine, including in combination a series of carriages and means to move them through a circuit; wrapping mechanism on each; means to position a wrapper and actuate said mechanism; means to position another wrapper and actuate said mechanism, there being a gripper for depressing the article upon the second wrapper, leaving one of the edges of the second wrapper upstanding; a wiper having an oscillating movement in the direction of travel, rubbing against said upstanding edge; and means to deposit on said wiper a measured quantity of paste at each oscillation.

104. A wrapping machine, including in combination a series of carriages and means to move them through a circuit; wrapping mechanism on each; means to position a wrapper and actuate said mechanism; means to position another wrapper and actuate said mechanism, there being a gripper for depressing the article upon the second wrapper, leaving one of the edges of the second wrapper upstanding; a wiper having an oscillating movement in the direction of travel, rubbing against said upstanding edge; the said wiper having at its edge a hollow interior, a plunger within it, and means imparting to the plunger a predetermined movement inward on each oscillation.

105. A wrapping machine, including in combination a series of carriages and means to move them through a circuit; wrapping mechanism on each; means to position a wrapper and actuate said mechanism; means to position another wrapper and actuate said mechanism, there being a gripper for depressing the article upon the second wrapper, leaving one of the edges of the second wrapper upstanding; a wiper having an oscillating movement in the direction of travel, rubbing against said upstanding edge; and means to deposit on said wiper a measured quantity of paste at each oscillation; comprising the provision of a hollow paste-holding interior in the wiper, a narrow slot discharging therefrom in the part which wipes the edge of the wrapper, and means to force out through said slot.

106. A wrapping machine, including in combination a series of carriages and means to move them through a circuit; wrapping mechanism on each; means to position a wrapper and actuate said mechanism; means to position another wrapper and actuate said mechanism, there being a gripper for depressing the article upon the second wrapper, leaving one of the edges of the second wrapper upstanding; a wiper having an oscillating movement in the direction of travel, rubbing against said upstanding edge; and means to deposit on said wiper a measured quantity of paste at each oscillation; comprising the provision of a hollow interior and a discharge slot therefrom in said wiper; a plunger therein; a pawl and ratchet feed for the plunger; and a lost motion mechanism driving the ratchet and driven by the oscillation of the wiper, whereby the feed by the ratchet is controlled.

107. A wrapping machine, including in combination a series of carriages and means to move them through a circuit; wrapping mechanism on each; means to position a wrapper and actuate said mechanism; means to position another wrapper and actuate said mechanism, there being a gripper for depressing the article upon the second wrapper, leaving one of the edges of the second wrapper upstanding; a wiper having an oscillating movement in the directions of travel, rubbing against said upstanding edge; and means to deposit on said wiper a measured quantity of paste at each oscillation; comprising the provision of a hollow interior and a discharge slot therefrom in said wiper; a plunger therein; a pawl and ratchet feed for the plunger; and a lost motion mechanism driving the ratchet and driven by the oscillation of the wiper, whereby the feed by the ratchet is controlled; the said pawl being mounted on an arm pivoted centrally with the ratchet wheel and having a pin, and there being another block $p^{10}$ sliding on a fixed guide, to which block said pawl arm is connected by a pin and slot connection extending perpendicularly to the sliding, the frictional resistance of sliding in said guide being less than the resistance of said paste to feeding, whereby the block slides to its limit before the pawl arm turns and actuates the feed.

108. A wrapping machine, including in combination a series of carriages and means to move them through a circuit, said circuit comprising a horizontal portion with circular curved guides at its beginning and end, and an endless chain passing around said guides; gripping and wrapping mechanism for articles on each carriage, and means to supply articles and to actuate said mechanism during the horizontal portion of the travel of the carriages; means to apply paste to a wrapper near the end of the horizontal travel; and means to discharge the wrapped article downward by gravity during the return under said horizontal part of the circuit; there being means for holding the wrapper giving time for paste to set during the under portion of the travel.

109. A wrapping machine, including in combination a series of carriages and means to move them through a circuit; wrapper and article supply mechanism in stationary positions above the circuit; and clamps carried on the carriages and adapted to work inward and downward from the sides of the carriages to seize the stationarily held materials as each carriage passes.

110. A wrapping machine, including in combination a series of carriages and means to move them through a circuit; wrapping mechanism on each; a series of stationary supply stations having moving parts for feeding articles and wrappers; cams stationary on the machine adapted to work moving appliances on the carriages, and lugs stationary on the carriages adapted to work moving parts on said supply mechanisms as the carriages individually pass them.

111. A wrapping machine, including in combination a series of carriages and means to move them through a circuit; tin foil applying mechanism, article-applying mechanism, label-applying mechanism, and paste-applying mechanism arranged in succession above the circuit; gripping mechanism on each carriage for the tin foil, the article and the label respectively; wrapping mechanism on each carriage, and means whereby the wrapping mechanism acts as the carriage progresses along said circuit.

Signed by me at Boston, Mass., this fourth day of August, 1915.

CHARLES M. GREEN.

Witnesses:
JOSEPH T. BRENNAN,
FRANCES M. HEALEY.